(12) United States Patent
Yamaguchi

(10) Patent No.: US 12,118,450 B2
(45) Date of Patent: Oct. 15, 2024

(54) INFORMATION PROCESSING APPARATUS, INFORMATION PROCESSING METHOD, AND PROGRAM

(71) Applicant: Sony Group Corporation, Tokyo (JP)

(72) Inventor: Takamori Yamaguchi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/413,520

(22) PCT Filed: Dec. 12, 2019

(86) PCT No.: PCT/JP2019/048725
§ 371 (c)(1),
(2) Date: Jun. 11, 2021

(87) PCT Pub. No.: WO2020/129810
PCT Pub. Date: Jun. 25, 2020

(65) Prior Publication Data
US 2022/0012561 A1 Jan. 13, 2022

(30) Foreign Application Priority Data
Dec. 21, 2018 (JP) ................................ 2018-239087

(51) Int. Cl.
*G06N 3/04* (2023.01)
*G06N 20/00* (2019.01)
*G06V 20/58* (2022.01)

(52) U.S. Cl.
CPC ............... *G06N 3/04* (2013.01); *G06V 20/58* (2022.01)

(58) Field of Classification Search
None
See application file for complete search history.

(56) References Cited

U.S. PATENT DOCUMENTS

| 2006/0092043 A1 | 5/2006 | Lagassey |
| 2014/0277833 A1 | 9/2014 | Palan |
| 2018/0357484 A1* | 12/2018 | Omata ................. G06V 20/582 |
| 2019/0220011 A1* | 7/2019 | Della Penna ........ G08G 1/0112 |
| 2019/0382035 A1* | 12/2019 | Li ......................... G06V 20/582 |
| 2020/0191593 A1* | 6/2020 | Herman ................. G06Q 10/02 |

FOREIGN PATENT DOCUMENTS

| JP | 5228366 B2 | 7/2013 |
| JP | 2017-083990 A | 5/2017 |
| JP | 2017138694 A | 8/2017 |
| JP | 2018041123 A | 3/2018 |
| JP | 2018055471 A | 4/2018 |

OTHER PUBLICATIONS

International Search Report and Written Opinion mailed May 19, 2020 in connection with International Application No. PCT/JP2019/048725.

* cited by examiner

*Primary Examiner* — Samuel D Fereja
(74) *Attorney, Agent, or Firm* — Wolf, Greenfield & Sacks, P.C.

(57) ABSTRACT

An information processing apparatus includes: a processor in communication with a memory configured to store instructions that, when executed by the processor, cause the processor to set a label based on element information included in scene information for a scene, and determine, based on the set label, whether or not to store the scene information set with the label.

20 Claims, 11 Drawing Sheets

FIG. 2

| LABEL | SCENE |
|---|---|
| TRAVELING SITUATION | TRAVELING ON LOCAL ROAD |
| | TRAVELING ON HIGHWAY |
| | STOPPING AT RED LIGHT |
| | TURNING LEFT, TURNING RIGHT |
| TRAFFIC SITUATION | PEDESTRIAN IS WALKING NEAR MOBILE OBJECT |
| | BICYCLE IS TRAVELING NEAR MOBILE OBJECT |
| | AUTOMOBILE IS TRAVELING NEAR MOBILE OBJECT |
| | PEDESTRIAN RUNS INTO ROAD |
| | TRAFFIC JAM |
| ENVIRONMENT SITUATION | WEATHER (FINE, RAINY, SNOW, CLOUDY) |
| | BRIGHTNESS (MORNING, DAYTIME, NIGHTTIME, BACKLIGHT) |
| | ROAD SITUATION (DRY, FROZEN, SNOW-COVERED, MOIST) |
| ... | ... |

INFORMATION PROCESSING APPARATUS, INFORMATION PROCESSING METHOD, AND PROGRAM

CROSS REFERENCE TO RELATED APPLICATIONS

This application claims the benefit under 35 U.S.C. § 371 as a U.S. National Stage Entry of International Application No. PCT/JP2019/048725, filed in the Japanese Patent Office as a Receiving Office on Dec. 12, 2019, which claims priority to Japanese Patent Application Number JP 2018-239087 filed in the Japanese Patent Office on Dec. 21, 2018, each of which is hereby incorporated by reference in its entirety.

TECHNICAL FIELD

The present disclosure relates to an information processing apparatus, an information processing method, and a program.

BACKGROUND ART

PTL 1 discloses a learning method and the like for classifying traffic flow information indicating a traffic flow per road section collected by a plurality of probe vehicles and traveling of the probe vehicles into a plurality of time zones according to the characteristics of the traffic flow information, and storing it in a database. Further, PTL 2 discloses an information providing method and the like for classifying input data by use of a classifier, generating information indicating a degree of confidence on the basis of the classification result, and outputting it together with the classification result.

CITATION LIST

Patent Literature

PTL 1: JP 5228366B2
PTL 2: JP 2017-83990A

SUMMARY

Technical Problem

In the related art, in a case where a large amount of classified data is collected and accumulated in a database, specific data is difficult to extract from the database. Further, in a case where the classified data is used for machine learning of a robot, an automobile, or the like, the data is difficult to effectively use by the use of only the past data classification, and it is desired to effectively use the accumulated data.

Thus, the present disclosure proposes an information processing apparatus capable of restricting the amount of data to be saved and contributing to accumulation of effectively usable data, an information processing method, and a program.

Solution to Problem

In order to solve the above problem, an information processing apparatus according to an embodiment of the present disclosure includes a processor in communication with a memory configured to store instructions that, when executed by the processor, cause the processor to set a label based on element information included in scene information for a scene, and determine, based on the set label, whether or not to store the scene information set with the label.

Further, an information processing method according to an embodiment of the present disclosure performed by a computer including a processor in communication with a memory configured to store instructions that, when executed by the processor, cause the processor to perform setting a label based on element information included in scene information for a scene, and determining, based on the set label, whether or not to store the scene information set with the label.

Further, a non-transitory computer readable medium comprising a program that, when executed by a processor, cause the processor to set a label corresponding to element information included in scene information for a scene, and determine, based on the set label, whether or not to store the scene information set with the label.

BRIEF DESCRIPTION OF DRAWINGS

FIG. 2 is a diagram illustrating exemplary relationships between labels and scenes in the information processing method according to the first embodiment.

DESCRIPTION OF EMBODIMENTS

Figure 1:
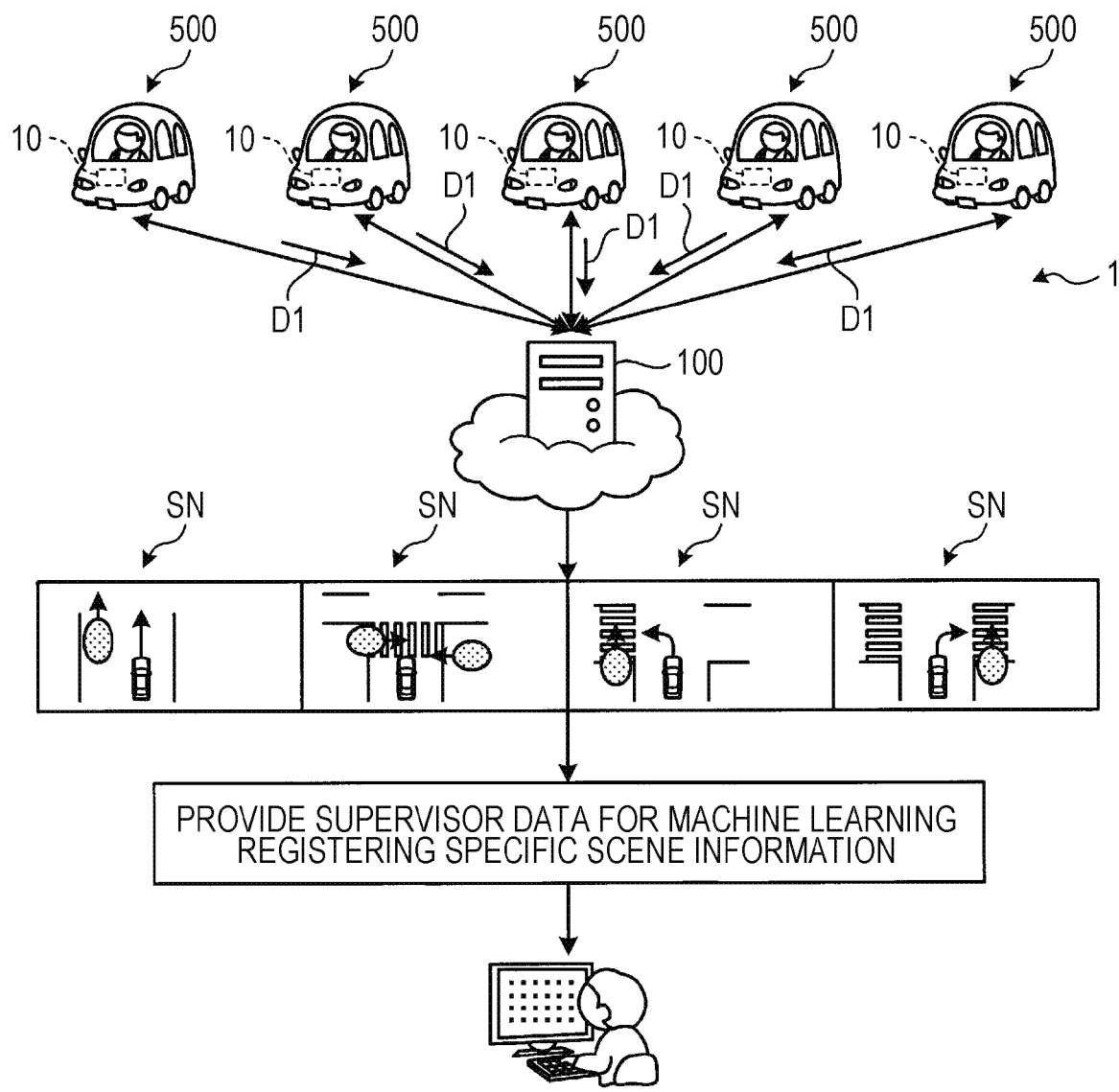
FIG. 1 is a diagram for explaining an exemplary information processing method according to a first embodiment.

Embodiments of the present disclosure will be described below in detail with reference to the drawings. Additionally, the same parts are denoted with the same reference numerals in each of the following embodiments, and a repeated description thereof will be omitted.

First Embodiment

<Outline of System According to First Embodiment>

FIG. 1 is a diagram for explaining an exemplary information processing method according to a first embodiment. FIG. 2 is a diagram illustrating exemplary relationships between labels and scenes in the information processing method according to the first embodiment.

As illustrated in FIG. 1, a system 1 includes a plurality of information processing apparatuses 10, and an information processing server 100. Each of the information processing apparatuses 10 is mounted on a mobile object 500. The mobile objects 500 illustrated in FIG. 1 are autonomously-movable mobile objects, for example. The mobile objects 500 include vehicles (motor cycle, four-wheel vehicle, bicycle), robots, wagons, ships, flying objects (such as airplane, unmanned aerial vehicle (UAV), and drone), and the like, for example. The present embodiment will be described assuming that the mobile objects 500 are four-wheel vehicles. Further, the example illustrated in FIG. 1 describes that the system 1 includes five information processing apparatuses 10, but the number of information processing apparatuses 10 is not limited thereto. The information processing apparatuses 10 and the information processing server 100 are configured to be able to communicate via a network, for example, or to directly communicate not via a network.

For example, in a case where the information processing server 100 collects information from a plurality of information processing apparatuses 10, the collected information is difficult to classify when the amount of collected information remarkably increases. For example, in a case where behaviors of an automobile at an intersection are machine-learned, the information associated with the scenes at the intersections needs to be extracted from the plurality of items of collected information, but the desired information is difficult to extract from the collected information. Thus, the information processing apparatuses 10 according to the present embodiment restrict the amount of data saved therein, and contribute to accumulation of effectively usable information.

The information processing apparatus 10 is configured to acquire sensor information output by the sensors of the mobile object 500, for example. The sensors include various sensors such as shooting apparatus, acceleration sensor, and position sensor. The information processing apparatus 10 has a function of classifying the scenes SN of the mobile object 500 on the basis of the acquired sensor information. The scenes SN associated with traveling situation of the mobile object 500 include various scenes such as traveling on a local road, crossing at a cross walk, turning left on a local road, turning right on a local road, and stopping at a red light. The scenes SN associated with traffic situation of the mobile object 500 include various scenes indicating that a pedestrian is walking near, that a bicycle is traveling near, that a vehicle is traveling near, that a pedestrian runs into a road, traffic jam, and the like, for example. The scenes SN associated with environment situation of the mobile object 500 include various scenes such as weather, brightness around the mobile object 500, and situations of roads.

For example, the information processing apparatus 10 recognizes a scene SN of the mobile object 500 on the basis of the acquired sensor information. The recognition processing is to recognize a situation of the mobile object 500, a situation around the mobile object 500, and the like. The situations of the mobile object 500 to be recognized include position, posture, and motion (such as speed, acceleration, and moving direction) of the mobile object 500, presence of abnormality, and the like. The situations around the mobile object 500 to be recognized include kind and position of surrounding still object, kind, position, and motion (such as speed, acceleration, and moving direction) of surrounding moving object, configuration of surrounding road and the state of road, surrounding weather, temperature, humidity, brightness, and the like, for example. The information processing apparatus 10 has a function of setting a label indicating the characteristics for classifying a scene SN for scene information D1 when recognizing the scene SN of the mobile object 500 in the recognition processing. The label is electronic information set for the scene information D1. To set a label for the scene information D1 includes to associate electronic information indicating a label and the scene information D1, to add electronic information indicating a label to the scene information D1, and the like. The scene information D1 includes the sensor information used for recognizing the scene SN, for example. The information processing apparatus 10 has a function of providing the scene information D1 set with the label to the information processing server 100 and the like.

For example, the information processing apparatus 10 sets a label for the scene information D1 on the basis of the relationship between the recognized scene SN and the label illustrated in FIG. 2. For example, the information processing apparatus 10 assumes that the recognized scene SN is any of traveling on a local road, traveling on a highway, stopping at a red light, turning left, and turning right. In this case, the information processing apparatus 10 sets the label "traveling situation" for the scene information D1. For example, the information processing apparatus 10 assumes that the recognized scene SN is that any of a pedestrian, a bicycle, and an automobile is traveling near the mobile object 500, that a pedestrian runs into a road, or a traffic jam. In this case, the information processing apparatus 10 sets the label "traffic situation" for the scene information D1. For example, the information processing apparatus 10 assumes that the recognized scene SN is any of weather (fine, rainy, snow, cloudy), brightness (morning, daytime, nighttime, backlight), and a road situation (dry, frozen, snow-covered, moist). In this case, the information processing apparatus 10 sets the label "environment situation" for the scene information D1. Further, in a case where the information processing apparatus 10 recognizes a plurality of scenes SN, it sets a plurality of labels for the scene information D1. For example, in a case where the recognized scenes SN are traveling on a local road, automobile's traveling near the mobile object 500, and the weather, the information processing apparatus 10 sets the three labels "traveling situation", "traffic situation", and "environment situation" for the scene information D1.

Returning to FIG. 1, the information processing server 100 is a Cloud server or a server apparatus for performing information processings in association with the information processing apparatuses 10. The information processing server 100 is an exemplary external server provided outside the mobile objects 500. The information processing server 100 has a function of collecting the scene information D1 from a plurality of information processing apparatuses 10, and classifying and accumulating the scene information D1 on the basis of the labels set for the scene information D1 in a database. The information processing server 100 has a function of providing the scene information D1 associated with a specific scene SN as supervisor data for machine learning to the developer and the like. The specific scene SN is a scene SN desired for machine learning, for example. The information processing server 100 provides the supervisor data for machine learning in which the specific scene information D1 is registered.

<Exemplary Configuration of System according to First Embodiment>

<Mobile Object 500>

Figure 3:
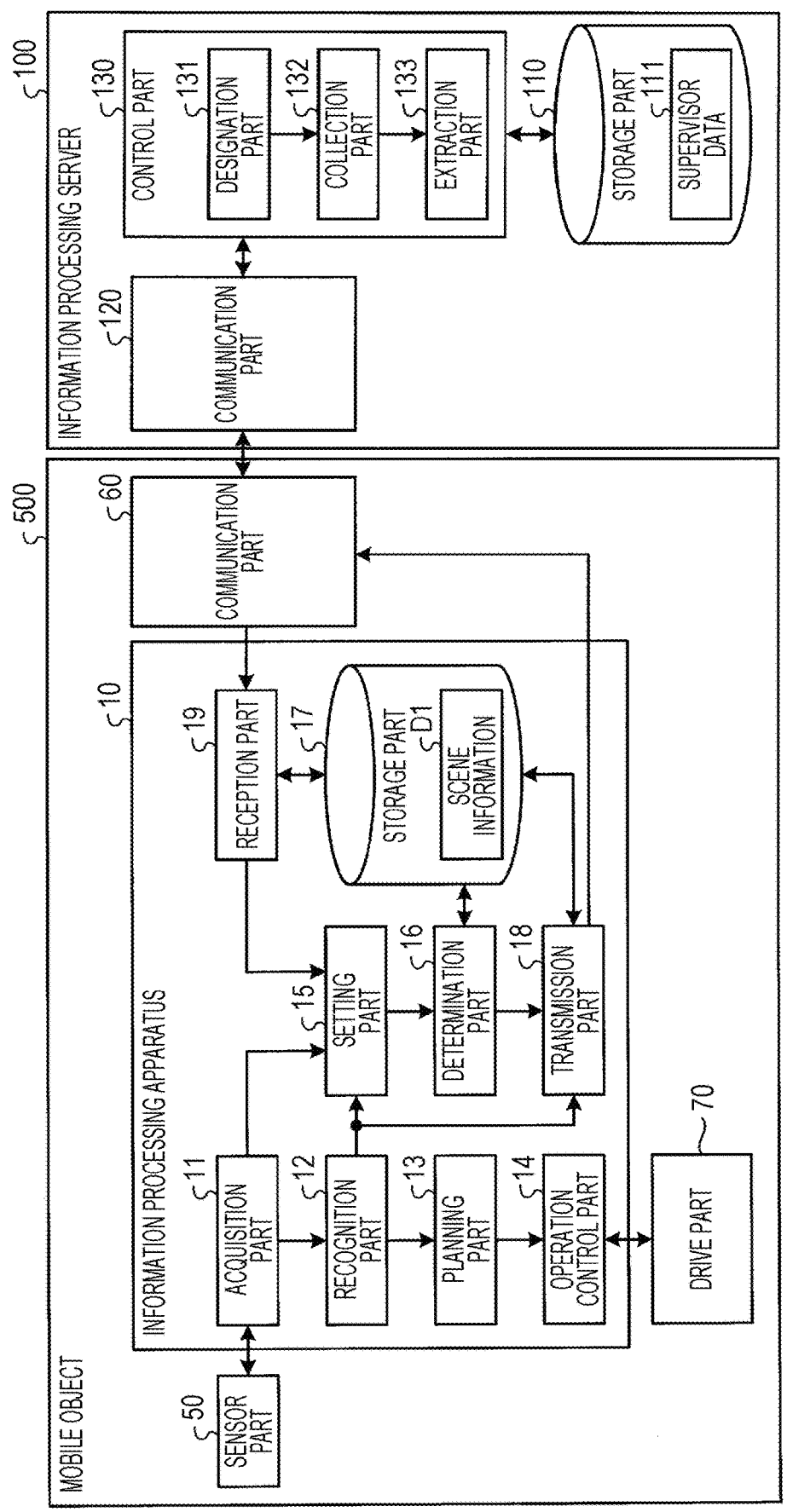
FIG. 3 is a diagram illustrating an exemplary configuration of a system according to the first embodiment.

An exemplary configuration of the mobile object 500 including the information processing apparatus 10 according to the present embodiment will be described below. FIG. 3 is a diagram illustrating an exemplary configuration of the system according to the first embodiment.

As illustrated in FIG. 3, the mobile object 500 includes a sensor part 50, a communication part 60, a drive part 70, and the information processing apparatus 10. The sensor part 50, the communication part 60, the drive part 70, and the information processing apparatus 10 are mutually connected via a communication network. The communication network is configured of a vehicle-mounted communication network, a bus, or the like conforming to any standard such as controller area network (CAN), local interconnect network (LIN), local area network (LAN), or FlexRay (registered trademark). Additionally, the respective parts in the mobile object 500 may be directly connected not via the communication network.

The sensor part 50 includes various sensors for detecting data used for the processings of the mobile object 500, and supplies the detected data to each part in the mobile object 500. For example, the sensor part 50 supplies the sensor information indicating the detected result to the information processing apparatus 10.

For example, the sensor part 50 includes various sensors for detecting a state and the like of the mobile object 500. Specifically, the sensor part 50 includes a gyro sensor, an acceleration sensor, an inertial measurement unit (IMU), and a sensor for detecting the operation amount of the acceleration pedal, the operation amount of the brake pedal, the steering angle of the steering wheel, engine revolutions, motor revolutions, or the rotation speed of the wheels, for example.

For example, the sensor part 50 includes an external sensing part configured of various sensors for detecting the information indicating the exterior of the mobile object 500. Specifically, the sensor part 50 includes shooting apparatuses such as time of flight (ToF) camera, stereo camera, monocular camera, infrared camera, depth camera, and other cameras. The shooting apparatuses are provided at the front nose, the side mirrors, the rear bumper, and the like of the mobile object 500, for example.

For example, the sensor part 50 includes an environment sensor for detecting the weather, a meteorological phenomenon, or the like, and a surrounding information detection sensor for detecting an object around the mobile object 500. The environment sensor is configured of a raindrop sensor, a fog sensor, a sunlight sensor, a snow sensor, and the like, for example. The surrounding information detection sensor is configured of an ultrasonic sensor, a radar, a light detection and ranging, laser imaging detection and ranging (LiDAR), a sonar, and the like, for example.

For example, the sensor part 50 includes various sensors for detecting a current position of the mobile object 500. Specifically, the sensor part 50 includes a global positioning system (GPS) receiver, a global navigation satellite system (GNSS) receiver for receiving a GNSS signal from the GNSS satellite, and the like, for example. The sensor part 50 includes an absolute pressure sensor for detecting a change in atmospheric pressure due to a difference in height, for example. The sensor part 50 includes a microphone for collecting the sounds around the mobile object 500, for example.

The communication part 60 makes communication with the in-vehicle devices of the mobile object 500, various external electronic devices, the information processing server 100, a base station, and the like. The communication part 60 outputs data received from the information processing server 100 to the information processing apparatus 10, or transmits data from the information processing apparatus 10 to the information processing server 100. Additionally, a communication protocol supported by the communication part 60 is not particularly limited, and the communication part 60 can support a plurality of kinds of communication protocols.

For example, the communication part 60 makes wireless communication with the information processing apparatus 10 and the like via wireless LAN, Bluetooth (registered trademark), near field communication (NFC), wireless USB (WUSB), or the like. Further, the communication part 60 makes wired communication with the information processing apparatus 10 and the like via a connection terminal (not illustrated) (and a cable as necessary), universal serial bus (USB), high-definition multimedia interface (HDMI) (registered trademark), mobile high-definition link (MHL), or the like, for example.

For example, the communication part 60 makes communication with the information processing server 100 present on an external network (such as Internet, Cloud network, or provider-specific network) via a base station or access point. Further, the communication part 60 makes communication with a terminal present near the mobile object 500 (such as terminal of pedestrian or shop, or machine type communication (MTC) terminal) by use of the peer to peer (P2P) technology, for example. Further, the communication part 60 makes V2X communication such as vehicle to vehicle communication, vehicle to infrastructure communication, vehicle to home communication, and vehicle to pedestrian communication, for example. Further, the communication part 60 includes a beacon reception part, for example, receives a radio wave or electromagnetic wave originated from a wireless station or the like installed on a road, and acquires the information indicating current position, traffic jam, traffic regulation, duration, or the like.

The drive part 70 includes various apparatuses for the drive system of the mobile object 500. For example, the drive part 70 includes a driving force generating apparatus for generating a driving force for the internal engine, the drive motor, or the like, a driving force transmission mechanism for transmitting a driving force to the wheels, a steering mechanism for adjusting the steering angle, a braking apparatus for generating a braking force, antilock brake system (ABS), electronic stability control (ESC), an electric power steering apparatus, and the like. Additionally, the drive part 70 may include various apparatuses for the body system of the mobile object 500, for example. The drive part 70 may include a keyless entry system, a smart key system, a power window apparatus, a power seat, the steering wheel, an air-conditioning system, various lamps, and the like, for example.

<Information Processing Apparatus 10>

An exemplary functional configuration of the information processing apparatus 10 according to the present embodiment will be described below. As illustrated in FIG. 2, the information processing apparatus 10 includes an acquisition part 11, a recognition part 12, a planning part 13, an operation control part 14, a setting part 15, a determination part 16, a storage part 17, a transmission part 18, and a reception part 19. The programs stored inside the information processing apparatus 10 are executed by the CPU, MPU, or the like, for example, by use of the RAM or the like as a work area so that the respective function parts of the acquisition part 11, the recognition part 12, the planning part 13, the operation control part 14, the setting part 15, and the determination part 16 are realized. Further, each processing part may be realized by an integrated circuit such as ASIC or FPGA.

The acquisition part 11 acquires the scene information D1 indicating a scene from the sensor part 50 or the like. For example, the acquisition part 11 acquires the sensor information supplied by the sensor part 50, and acquires the sensor information as the scene information D1. The acquisition part 11 acquires the scene information D1 including the sensor information of at least one of a plurality of kinds of sensors in the sensor part 50. The acquisition part 11 sets time information for acquiring the scene information D1 as the scene information D1. For example, the acquisition part 11 sets a timestamp indicating time/date, date, time, or the like when information for the acquired sensor information is acquired. That is, the acquisition part 11 sets a timestamp, thereby specifying a temporal correspondence of the sensor information acquired from the sensor part 50. The acquisition part 11 then outputs the scene information D1 acquired from the sensor part 50 to the recognition part 12, the setting part 15, or the like, for example.

The recognition part 12 recognizes element information included in the scene information D1 acquired by the acquisition part 11. The recognition part 12 recognizes a situation of the mobile object 500, a surrounding situation, a current position, and the like on the basis of the scene information D1, and classifies the scene on the basis of the recognition result. The recognition part 12 specifies the scene information D1 at a specific time with reference to the timestamp set for the scene information D1, and performs the recognition processing based on the specified scene information D1 thereby to classify the scene.

For example, the recognition part 12 detects the information indicating the exterior of the mobile object 500 on the basis of the image shot by the shooting apparatus in the sensor part 50, or the scene information D1 indicating the detection result and the like of the environment sensor and the surrounding information detection sensor, and recognizes the element information in the scene on the basis of the detection result. In this case, the element information includes the elements such as vehicle, person, obstacle, structure, road, traffic light, traffic sign, traffic indication, weather, surrounding brightness, and road situation. The element information is one or more elements included in the scene. The element information is directed for classifying the scene. For example, the recognition part 12 detects a distance to an object on the basis of the scene information D1 indicating the detection result or the like of the surrounding information detection sensor in the sensor part 50, and recognizes the element information of the scene on the basis of the detection result. In this case, the element information includes elements such as a distance to an object, and a relative relationship between the mobile object and the object. For example, the recognition part 12 recognizes a traffic rule around the mobile object 500 on the basis of the image shot by the shooting apparatus in the sensor part 50 and the scene information D1 indicating the detection result and the like of the environment sensor and the surrounding information detection sensor. The recognition part 12 recognizes the position and state of a traffic light around the mobile object 500, the contents of a traffic regulation around the mobile object 500, a travelable lane, and the like, for example, in the recognition processing, and recognizes the recognition result as the element information. For example, the recognition part 12 detects an emergency event on the basis of the image shot by the shooting apparatus in the sensor part 50, and the scene information D1 indicating the detection result and the like of the environment sensor and the surrounding information detection sensor. The recognition part 12 detects an emergency event such as entry of the mobile object 500 into a danger zone, object's running into a road, or an abnormality of the mobile object 500, for example, and recognizes the detection result as element information. The recognition part 12 then outputs the recognized and classified result and the like to the planning part 13, the setting part 15, the transmission part 18, and the like.

The planning part 13 makes a plan for movement of the mobile object 500 on the basis of the recognition result of the recognition part 12. The planning part 13 has a function of making a route plan, an action plan, an operation plan, and the like. The planning part 13 plans a route of the mobile object 500 to a target value, for example, as a route plan. The planning part 13 plans an action of the mobile object 500, as an action plan, for safely traveling on the planned route within the planned time, for example. Specifically, the planning part 13 plans starting, stopping, traveling direction (such as traveling forward, traveling backward, turning left, turning right, and direction changing), traveling lane, traveling speed, overtaking, and the like, for example. The planning part 13 plans an operation of the mobile object 500, as an operation plan, for realizing the planned action, for example. Specifically, the planning part 13 plans acceleration, deceleration, traveling trajectory, and the like of the mobile object 500, for example. The planning part 13 plans an operation of the mobile object 500 for avoiding an emergency event such as sudden stop or sudden turning in a case where an occurrence of the emergency event is recognized. The planning part 13 then outputs the created plan to the operation control part 14.

The operation control part 14 controls the operations of the mobile objects 500 on the basis of the plans of the planning part 13. The operation control part 14 controls the drive part 70. For example, the operation control part 14 controls traveling of the mobile object 500 in order to realize the plans of the planning part 13. The operation control part 14 then outputs an operation instruction or the like to drive the mobile object 500 to the drive part 70.

The setting part 15 sets one or more labels corresponding to the element information included in the scene information D1 for the scene information D1 acquired by the acquisition part 11. The labels are information indicating the characteristics for classifying the scene. The setting part 15 sets a label corresponding to the element information recognized by the recognition part 12 for the scene information D1. Setting a label for the scene information D1 includes adding the information of a label to the scene information D1, or associating the scene information D1 and the information of a label, for example.

The setting part 15 has a function of setting a label for classifying a traffic sign for the scene information D1 when the scene information D1 acquired by the acquisition part 11 includes the element information indicating a traffic sign. For example, the setting part 15 sets the label "traffic sign" indicating that a traffic sign is included in the scene information D1 for the scene information D1, thereby extracting a scene including the traffic sign from a plurality of scenes. The label "traffic sign" may include information indicating the kind of a traffic sign, for example. In a case where a plurality of traffic signs is recognized in the scene information D1, the setting part 15 may set a label indicating the kinds of the traffic signs for the scene information D1. For example, in a case where the mobile object 500 is moving on a public road, the rules of the road on which the mobile object 500 is traveling need to be recognized. The setting part 15 sets the label "traffic sign" for the scene information D1, thereby contributing to classification of the scene information D1 including the element information of "traffic sign". Father, the traffic signs include the signs and the like of a parking area and the like, thereby contributing to realization of autonomous movement of the mobile object 500 in a parking area or the like not present on a map.

The setting part 15 has a function of setting a label for classifying a road shape for the scene information D1 when the scene information D1 acquired by the acquisition part 11 includes the element information indicating the road shape. For example, the setting part 15 sets the label "road shape" indicating that a road shape is included in the scene information D1 for the scene information D1, thereby extracting a scene including the road shape from a plurality of scenes. The label "road shape" may include information indicating a shape such as straight road, intersection, or curve. The label "road shape" may include information indicating a state of a road (such as the presence of unevenness or freeze).

The setting part 15 has a function of setting a label for classifying an obstacle on a traveling route for the scene information D1 when the scene information D1 acquired by the acquisition part 11 includes the element information indicating the obstacle. For example, the setting part 15 sets the label "obstacle" indicating that an obstacle is included in the scene information D1 for the scene information D1, thereby extracting a scene including the obstacle from a plurality of scenes. The label "obstacle" may include information indicating classification of a person who runs into ahead of the mobile object 500, an object such as bicycle, and an obstacle.

The setting part 15 sets a label for classifying a traffic situation for the scene information D1 when the scene information D1 acquired by the acquisition part 11 includes the element information indicating the traffic situation. For example, the setting part 15 sets the label "traffic situation" indicating that a traffic situation is included in the scene information D1 for the scene information D1, thereby extracting a scene including the traffic situation from a plurality of scenes. The label "traffic situation" may include information indicating that a pedestrian is walking, that a bicycle is traveling, that an automobile is traveling, the presence of a traffic jam, the presence of a traffic accident, or the like.

The setting part 15 has a function of setting a label for classifying environment information for the scene information D1 when the scene information D1 acquired by the acquisition part 11 includes the element information indicating the environment information. For example, the setting part 15 sets a label for classifying weather information for the scene information D1 when the scene information D1 acquired by the acquisition part 11 includes the element information indicating the weather information. For example, the setting part 15 sets the label "environment situation" indicating that environment information is included in the scene information D1 for the scene information D1, thereby extracting a scene including the environment situation from a plurality of scenes. The label "environment situation" may include information for classifying weather, brightness, road situation, or the like, for example.

The setting part 15 has a function of setting a label for classifying operation information of the mobile object 500 for the scene information D1 when the scene information D1 acquired by the acquisition part 11 includes the element information indicating the operation information. For example, the setting part 15 sets a label for classifying at least one of a steering operation or a brake operation of the mobile object 500 for the scene information D1 when the scene information D1 acquired by the acquisition part 11 includes the element information indicating at least one of the steering operation or the brake operation.

The setting part 15 has a function of setting a label indicating that the scene indicated by the scene information D1 is unknown for the scene information D1 when the label corresponding to the element information included in the scene information D1 acquired by the acquisition part 11 is not present. For example, even the scene information D1 which may not be recognized by the recognition part 12 is used for machine learning, and thus a new scene can be learned. Thus, the setting part 15 sets the label "unknown" for the scene information D1, for example, thereby extracting the scene information D1 used for learning a new scene from a plurality of items of scene information D1.

The present embodiment will be described assuming that the setting part 15 sets a label corresponding to element information recognized by the recognition part 12 for the scene information D1, but is not limited thereto. For example, in a case where the sensor information acquired by the acquisition part 11 includes element information, the setting part 15 may set a label corresponding to the element information acquired by the acquisition part 11 for the scene information D1.

The determination part 16 determines whether or not to hold the labeled scene information D1 on the basis of the set label. When a label matching with the set label or designated label is set for the scene information D1, the determination part 16 determines to save the scene information D1. The determination part 16 stores the scene information D1 set with the designated label in the storage part 17, thereby saving the scene information D1. For example, in a case where the label of traveling situation is designated, the determination part 16 determines to save the scene information D1 when the label of traveling situation is set for the scene information D1, and does not save the scene information D1 when the label of traveling situation is not set for the scene information D1. The determination part 16 then outputs the determination result to the transmission part 18.

For example, when all the scene information D1 acquired by the acquisition part 11 is saved, the amount of saved data remarkably increases, but if the amount of data to be saved is restricted, the desired scene information D1 may not be collected. To the contrary, the determination part 16 determines whether or not to hold the scene information D1 on the basis of the labels, thereby restricting the amount of data to be saved and saving various items of desired scene information D1.

The storage part 17 stores various items of data and programs. For example, the storage part 17 can store the scene information D1 determined to save by the determination part 16. The storage part 17 is electrically connected to the determination part 16, the transmission part 18, the reception part 19, and the like, for example. The storage part 17 is a RAM, a semiconductor memory device such as flash memory, a hard disc, an optical disc, or the like, for example. Additionally, the storage part 17 may be provided in a Cloud server connected to the information processing apparatus 10 via a network.

The transmission part 18 transmits the scene information D1 held in the storage part 17 to the information processing server 100. For example, the transmission part 18 transmits the scene information D1 to the information processing server 100 via the communication part 60, thereby uploading one or more items of saved scene information D1. The transmission part 18 transmits the scene information D1 held in the storage part 17 to the information processing server 100 in response to an instruction from the information processing server 100. In a case where the acquisition part 11 acquires specific scene information D1, the transmission part 18 transmits the scene information D1 set with a label by the setting part 15 to the information processing server 100. The specific scene information D1 includes the scene information D1 indicating a designated or set scene or the like, for example. The transmission part 18 transmits the scene information D1 held in the storage part 17 to the information processing server 100 at a certain cycle. In a case where the mobile object 500 is a vehicle, the transmission part 18 transmits the scene information D1 held in the storage part 17 to the information processing server 100 in a case where an emergency operation for at least one of the steering operation or the brake operation of the mobile object 500 is confirmed. Additionally, the transmission part 18 may delete the transmitted scene information D1 from the storage part 17.

When receiving designation information from the information processing server 100 via the communication part 60, the reception part 19 outputs the designation information to the setting part 15 and the like, and stores the designation information in the storage part 17. The designation information includes information indicating specific scene information D1 desired by the information processing server 100, for example.

The exemplary functional configuration of the information processing apparatus 10 according to the present embodiment has been described above. Additionally, the above configuration described with reference to FIG. 2 is merely exemplary, and the functional configuration of the information processing apparatus 10 according to the present embodiment is not limited to the example. The functional configuration of the information processing apparatus 10 according to the present embodiment can be flexibly modified depending on specification or operation.

<Information Processing Server 100>

An exemplary functional configuration of the information processing server 100 according to the present embodiment will be described below. As illustrated in FIG. 2, the information processing server 100 includes a storage part 110, a communication part 120, and a control part 130. The control part 130 is electrically connected to the storage part 110 and the communication part 120.

The storage part 110 is realized by, for example, a storage apparatus such as a RAM, a semiconductor memory device such as flash memory, a hard disc, or an optical disc. The storage part 110 stores the scene information D1 acquired from a plurality of information processing apparatuses 10 as supervisor data 111. The supervisor data 111 classifies the scene information D1 on the basis of the label set for the scene information D1, for example.

The communication part 120 has a function of making information communication with the information processing apparatus 10 via a network. Specifically, the communication part 120 transmits information requested by the control part 130 to the information processing apparatus 10. Further, when receiving information such as the scene information D1 from the information processing apparatus 10, the communication part 120 outputs the information to the control part 130.

The control part 130 controls the operations of the information processing server 100. The control part 130 has a designation part 131, a collection part 132, and an extraction part 133. The control part 130 executes the programs stored inside the control part 130 by use of the RAM or the like as a work area, for example, so that the respective function parts of the designation part 131, the collection part 132, and the extraction part 133 are realized.

The designation part 131 creates designation information D2 for designating a specific scene SN for the information processing apparatus 10, and transmits the designation information D2 to the information processing apparatus 10. For example, when acquiring a specific scene SN desired for machine learning of the situation determination function desired for autonomous movement of the mobile object 500, the designation part 131 transmits the designation information D2 indicating the specific scene SN to the information processing apparatus 10.

The collection part 132 collects the scene information D1 uploaded by one or more information processing apparatuses 10. For example, the collection part 132 collects the scene information D1 via the communication part 120, and classifies and registers the collected scene information D1 in the supervisor data 111. Additionally, the collection part 132 may collect the scene information D1 stored in a storage medium.

The extraction part 133 extracts the scene information D1 requested by a user or the like from the supervisor data 111 stored in the storage part 110, and provides the extracted scene information D1. For example, the extraction part 133 causes the user or the like to select a desired label from a list of labels set for the scene information D1, and extracts the scene information D1 set with the selected label from the supervisor data 111. Thereby, the extraction part 133 can extract specific scene information D1 on the basis of the label, thereby providing the scene information D1 suitable for machine learning.

The exemplary functional configuration of the information processing server 100 according to the present embodiment has been described above. Additionally, the above configuration described with reference to FIG. 2 is merely exemplary, and the functional configuration of the information processing server 100 according to the present embodiment is not limited to the above example. The functional configuration of the information processing server 100 according to the present embodiment can be flexibly modified depending on specification or operation.

<Information Processing Procedure According to First Embodiment>

Figure 4:
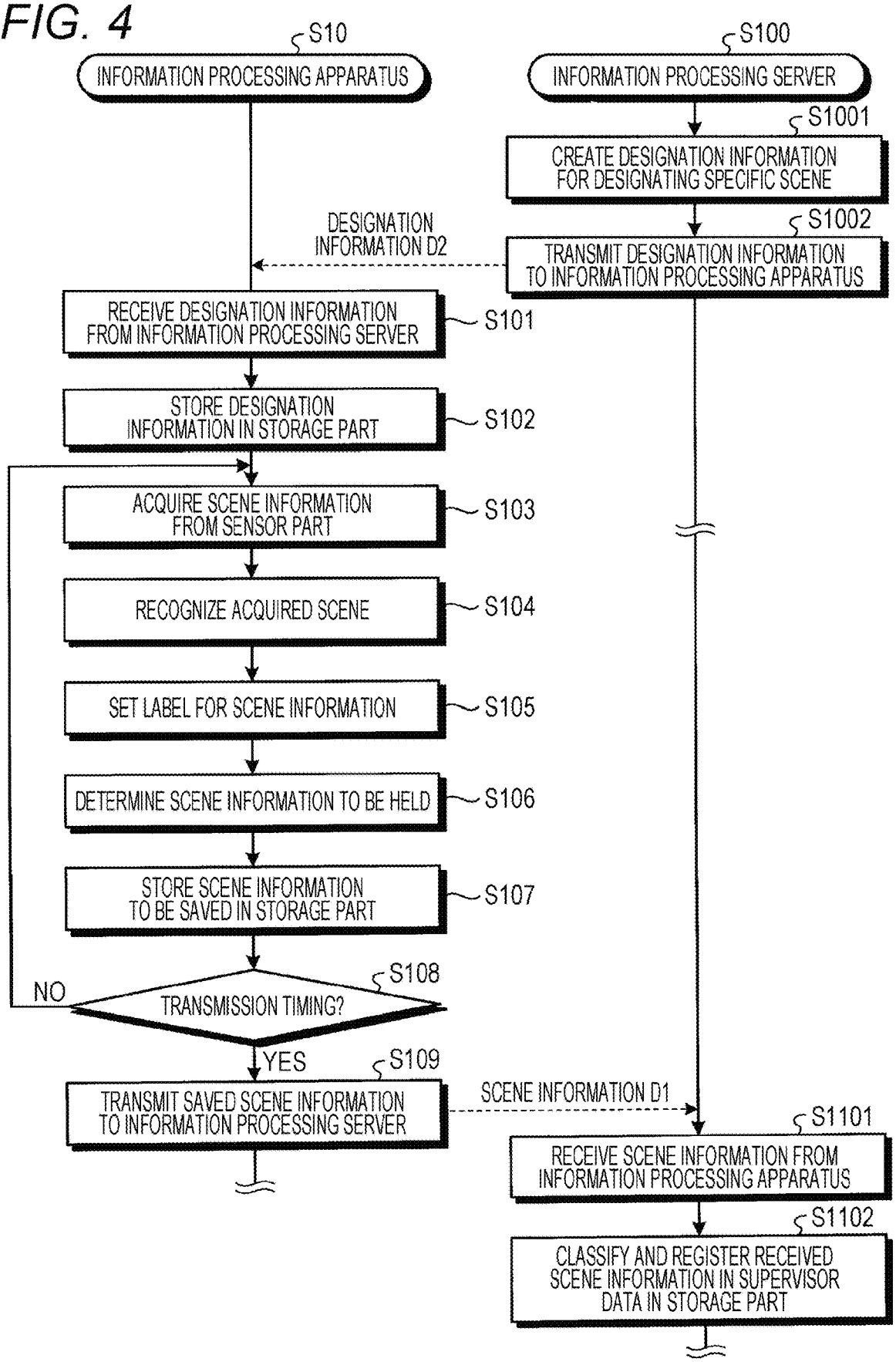
FIG. 4 is a sequence diagram illustrating an exemplary information processing procedure according to the first embodiment.

An information processing procedure according to the first embodiment will be described below with reference to FIG. 4. FIG. 4 is a sequence diagram illustrating an exemplary information processing procedure according to the first embodiment. The information processing apparatuses 10 and the information processing server 100 execute the programs so that the processing procedure illustrated in FIG. 4 is realized.

As illustrated in FIG. 4, the information processing server 100 creates the designation information D2 for designating a specific scene SN (step S1001). The information processing server 100 transmits the designation information D2 to the information processing apparatus 10 via the communication part 120 (step S1002). The information processing server 100 performs the processings in step S1001 and step S1002 thereby to function as the designation part 131.

The information processing apparatus 10 receives the designation information D2 from the information processing server 100 via the communication part 60 (step S101). The information processing apparatus 10 stores the received designation information D2 in the storage part 17 (step S102).

The information processing apparatus 10 acquires the scene information D1 from the sensor part 50 (step S103). For example, the information processing apparatus 10 receives the sensor information from the sensor part 50, and acquires the sensor information set with a timestamp as the scene information D1. The information processing apparatus 10 performs the processing in step S103 thereby to function as the acquisition part 11.

The information processing apparatus 10 recognizes the scene SN (step S104). For example, the information processing apparatus 10 performs the recognition processing thereby to recognize the scene SN associated with the mobile object 500, recognizes the element information included in the scene information D1, and stores the recognition result in the storage part 17. The information processing apparatus 10 performs the processing in step S104 thereby to function as the recognition part 12.

The information processing apparatus 10 sets a label for the scene information D1 on the basis of the recognition result (step S105). For example, the information processing apparatus 10 sets a label corresponding to the element information included in the scene information D1 for the scene information D1. For example, in a case where the information processing apparatus 10 may not recognize the element information in the scene information D1, it sets a label indicating that the scene SN is unknown for the scene information D1. The information processing apparatus 10 performs the processing in step S105 thereby to function as the setting part 15.

The information processing apparatus 10 determines the scene information D1 to be held (step S106). For example, the information processing apparatus 10 determines the scene information D1 to be saved, which is designated by the designation information D2 stored in the storage part 17, on the basis of the label set for the scene information D1. That is, the information processing apparatus 10 determines to save the scene information D1 including the element information designated by the designation information D2, and determines not to save the scene information D1 not including the element information. The information processing apparatus 10 performs the processing in step S106 thereby to function as the determination part 16.

The information processing apparatus 10 stores the scene information D1 to be saved in the storage part 17 (step S107). Consequently, the information processing apparatus 10 saves the scene information D1 designated by the designation information D2, and does not save the other scene information D1.

The information processing apparatus 10 determines whether or not it is at a transmission timing (step S108). For example, in a case where the information processing apparatus 10 is at a timing when it receives a transmission request from the information processing server 100, or acquires specific scene information D1, or a certain time elapses, the information processing apparatus 10 determines that it is at the transmission timing. In a case where the information processing apparatus 10 determines that it is not at the transmission timing (No in step S108), it returns the processing to step S103 previously described, and performs a series of processings. In a case where the information processing apparatus 10 determines that it is at the transmission timing (Yes in step S108), it advances the processing to step S109.

The information processing apparatus 10 transmits the saved scene information D1 to the information processing server 100 via the communication part 60 (step S109). Consequently, the information processing apparatus 10 uploads the saved scene information D1 on the information processing server 100. Thereafter, in a case where the mobile object 500 is operating, for example, the information processing apparatus 10 repeatedly performs the processings until the mobile object 500 finishes operating.

The information processing server 100 receives the scene information D1 from the information processing apparatus 10 via the communication part 120 (step S1101). The information processing server 100 classifies and registers the received scene information D1 in the supervisor data 111 in the storage part 110. The information processing server 100 performs the processings in step S1101 and step S1102 thereby to function as the collection part 132. Thereafter, the information processing server 100 enters the standby state.

<Operations of Information Processing Apparatus According to First Embodiment>

Figure 5:
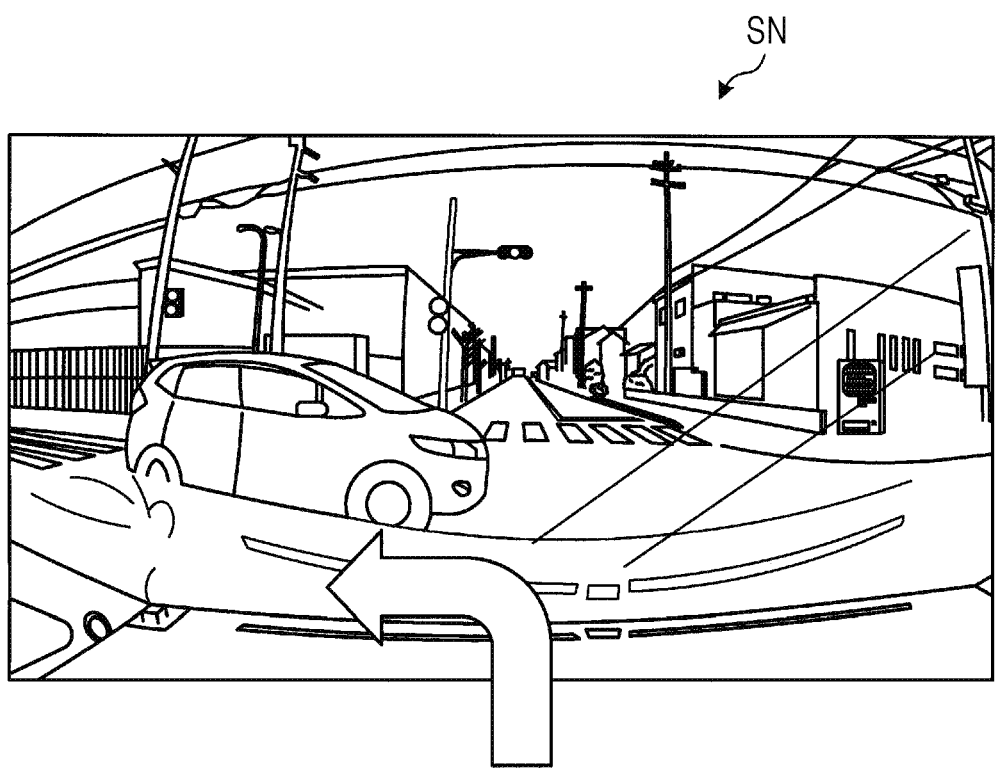
FIG. 5 is a diagram illustrating an exemplary scene of an information processing apparatus according to the first embodiment.
Figure 6:
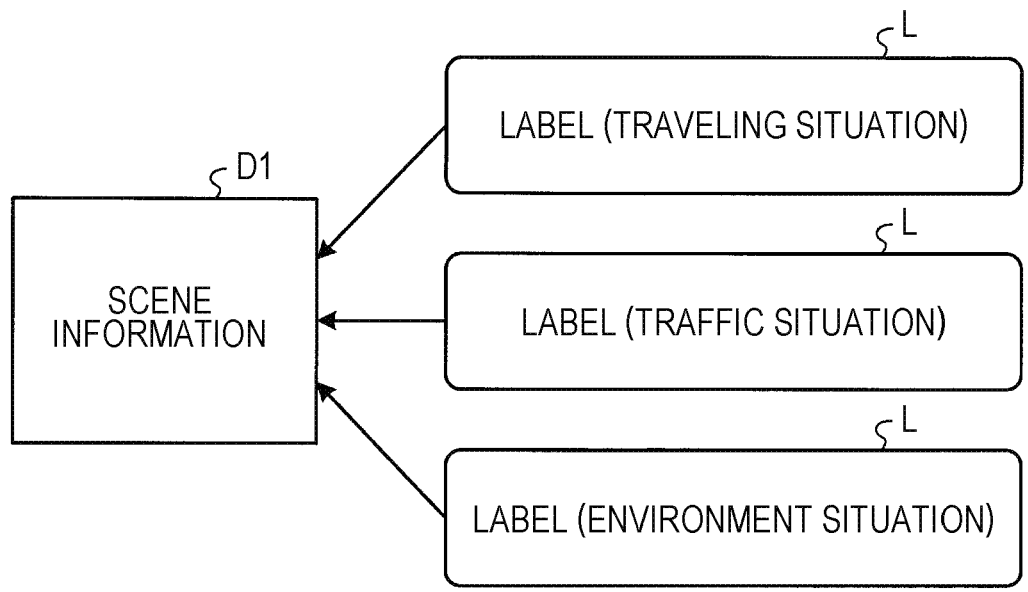
FIG. 6 is a diagram illustrating exemplary labels set for scene information in the information processing apparatus according to the first embodiment.

Exemplary operations of the information processing apparatus 10 according to the first embodiment will be described below with reference to FIG. 5 and FIG. 6. FIG. 5 is a diagram illustrating an exemplary scene of the information processing apparatus 10 according to the first embodiment. FIG. 6 is a diagram illustrating exemplary labels set for the scene information D1 in the information processing apparatus 10 according to the first embodiment.

The mobile object 500 is turning left at an intersection as in the scene SN illustrated in FIG. 5. The sensor part 50 then outputs the sensor information including shooting information indicating the front of the mobile object 500 shot by the shooting apparatus to the information processing apparatus 10. In this case, the information processing apparatus 10 sets a timestamp for the sensor information from the sensor part 50, and acquires the sensor information as scene information D1. The information processing apparatus 10 recognizes that the image information of the acquired scene information D1 includes the element information indicating turning left, automobile's traveling near the mobile object 500, daytime, and the like. Consequently, the information processing apparatus 10 sets three labels L of traveling situation, traffic situation, and environment situation for the scene information D1 as illustrated in FIG. 6. Then, in a case where the information processing server 100 gives an instruction to save a specific scene including the traveling situation and the traffic situation, the information processing apparatus 10 saves the scene information D1 illustrated in FIG. 6 in the storage part 17.

For example, it is assumed that the information processing apparatus 10 recognizes that the image information of the acquired scene information D1 includes the element information indicating only turning left and automobile's traveling near the mobile object 500. In this case, the information processing apparatus 10 sets two labels L of traveling situation and traffic situation for the scene information D1. Then, in a case where the information processing server 100 gives an instruction to save a specific scene including the traveling situation and the environment situation, the label L of environment situation is not set for the scene information D1, and thus the information processing apparatus 10 does not save the scene information D1.

As described above, the information processing apparatus 10 according to the first embodiment sets one or more labels L corresponding to the element information included in the scene information D1 for the acquired scene information D1, and determines whether or not to save the scene information D1 on the basis of the labels L. Thereby, the information processing apparatus 10 can select the scene information D1 to be saved on the basis of the set labels L, and can provide the scene information D1 set with the labels L. Consequently, the information processing apparatus 10 sets the labels L for the scene information D1, thereby restricting the data amount of the scene information D1 to be saved and contributing to accumulation of effectively usable data. Additionally, the mobile object 500 mounting the information processing apparatus 10 thereon can obtain the similar effects to the information processing apparatus 10.

Further, the information processing apparatus 10 recognizes the element information included in the acquired scene information D1, and sets the labels L corresponding to the element information for the scene information D1. Thereby, the information processing apparatus 10 can recognize the desired element information from the scene information D1, and can set any label L for the scene information D1. Consequently, the information processing apparatus 10 sets the label L suitable for classifying the scene SN for the scene information D1, thereby enhancing convenience of the scene information D1 to be saved.

Further, when the acquired scene information D1 includes the element information indicating the traffic situation, the information processing apparatus 10 sets a label L for classifying the traffic situation for the scene information D1. Thereby, the information processing apparatus 10 can set the label L indicating the scene information D1 of the traffic situation for the scene information D1. Consequently, the information processing apparatus 10 can contribute to classification of the scene information D1 associated with the traffic situation by the label L indicating the traffic situation.

Further, when the acquired scene information D1 includes the element information indicating the environment situation, the information processing apparatus 10 sets a label L for classifying the environment situation for the scene information D1. Thereby, the information processing apparatus 10 can set the label L indicating the scene information D1 of the environment situation for the scene information D1. Consequently, the information processing apparatus 10 can contribute to classification of the scene information D1 associated with the environment situation by the label L indicating the environment situation.

Further, the information processing apparatus 10 sets a timestamp (time information) when the scene information D1 is acquired for the scene information D1. Thereby, the information processing apparatus 10 can recognize a temporal correspondence between a plurality of items of scene information D1. Consequently, the information processing apparatus 10 can contribute to classification of the scene information D1 at a specific time.

Further, the information processing apparatus 10 transmits the scene information held in the storage part 17 to the information processing server (external server) 100. Thereby, the information processing apparatus 10 can transmit the scene information D1 determined to hold on the basis of the label L to the information processing server 100. Consequently, the information processing apparatus 10 transmits the scene information D1 with the restricted amount of data to be saved to the information processing server 100, thereby saving the data capacity managed by the information processing server 100.

Further, the information processing apparatus 10 transmits the held scene information D1 to the information processing server 100 in response to an instruction from the information processing server 100. Thereby, the information processing apparatus 10 can hold the scene information D1 desired by the information processing server 100, and transmit the scene information D1 thereto. Consequently, the information processing apparatus 10 transmits the scene information D1 designated by the information processing server 100, thereby contributing to more efficient classification of the scene information D1 in the information processing server 100.

Further, in a case where the information processing apparatus 10 acquires specific scene information D1, it transmits the scene information D1 set with the label L to the information processing server 100. Thereby, in a case where the information processing apparatus 10 acquires the scene information D1 designated by the information processing server 100, it transmits the scene information D1 to the information processing server 100. Consequently, the information processing apparatus 10 transmits the specific scene information D1 to the information processing server 100, thereby contributing to more efficient classification of the scene information D1 in the information processing server 100.

Further, the information processing apparatus 10 transmits the scene information D1 held in the storage part 17 to the information processing server 100 at a certain cycle. Thereby, the information processing apparatus 10 can periodically transmit the scene information D1 saved in the storage part 17 to the information processing server 100. Consequently, the information processing apparatus 10 periodically transmits the scene information D1, and thus the information processing server 100 does not need to control uploading of the scene information D1, thereby easily handling an increase in information processing apparatuses 10 from which information is to be collected.

Further, in a case where an emergency operation for at least one of the steering operation or the brake operation of the mobile object 500 is confirmed, the information processing apparatus 10 transmits the scene information D1 held in the storage part 17 to the information processing server 100. Thereby, in a case where a user emergency operation is performed on the mobile object 500, the information processing apparatus 10 can transmit the scene information D1 to the information processing server 100. Consequently, the information processing apparatus 10 can transmit the scene information D1 when the emergency operation is performed on the mobile object 500, thereby causing the information processing server 100 to recognize the scene information D1 associated with the emergency operation.

Further, in a case where the label L corresponding to the element information included in the scene information D1 is not present, the information processing apparatus 10 sets the label L indicating that the scene indicated by the scene information D1 is unknown for the scene information D1. Thereby, the information processing apparatus 10 sets the label L indicating the unclassifiable scene for the scene information D1, thereby setting a gap between the classified scene and the actually possible action as the label L. For example, in a scene classified as a highway, the mobile object 500 plans to travel assuming that a person and an object such as bicycle are not present on a road. In a case where an object is recognized and an emergency stop operation is caused in the situation, a gap is present between the scene and the actual behavior. Such a gap as unclassifiable scene needs to be given as supervisor data in a case where a scene is classified for application of machine learning. The information processing apparatus 10 sets the label L also for the scene information D1 indicating a situation where the gap is present, thereby providing the scene information D1 used for machine learning also to the information processing server 100. Consequently, the information processing apparatus 10 can cause the developer or the like to intensively analyze the unclassifiable scene information D1, thereby efficiently increasing the scenes in which autonomous movement is possible.

Further, the information processing apparatus 10 acquires the scene information D1 including the sensor information of at least one of a plurality of kinds of sensors. For example, in a case where the sensor part 50 includes a shooting apparatus, a radar, and a LiDAR, the shooting apparatus is different from the radar and the LiDAR in their own detection object. A detection result of the shooting apparatus is suitable for recognizing an object, but a distance and the like of the object are difficult to recognize. Further, the radar and LiDAR can recognize a distance and the like of an object, but an object is difficult to recognize. In such a case, the acquisition part 11 in the information processing apparatus 10 acquires the scene information D1 in a combination of the sensor information of the shooting apparatus and the sensor information of the radar and LiDAR. Thereby, the information processing apparatus 10 can acquire the scene information D1 suitable for recognizing or analyzing a scene, and can set a label for the scene information D1. Consequently, the information processing apparatus 10 provides the scene information D1 including the sensor information corresponding to the scene, and thus the information processing server 100 can efficiently collect the scene information D1 as a dataset.

<Variant (1) of First Embodiment>

Figure 7:
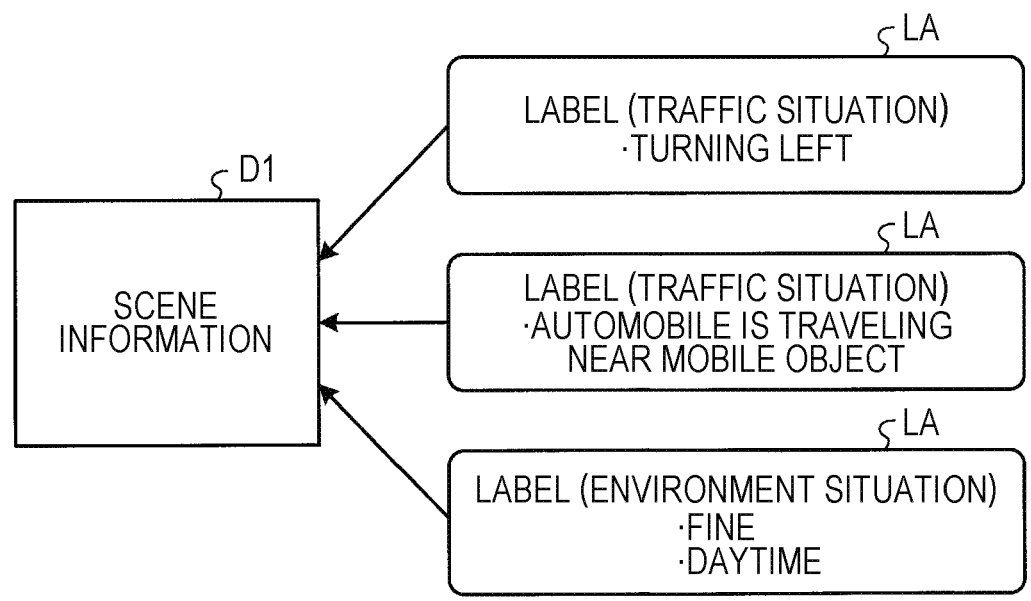
FIG. 7 is a diagram illustrating exemplary labels set for the scene information in the information processing apparatus according to a variant (1) of the first embodiment.

Exemplary operations of the information processing apparatus 10 according to a variant (1) of the first embodiment will be described below with reference to FIG. 5 and FIG. 7. FIG. 7 is a diagram illustrating exemplary labels set for the scene information D1 in the information processing apparatus 10 according to the variant (1) of the first embodiment.

The mobile object 500 is turning left at an intersection as in the scene SN illustrated in FIG. 5. The sensor part 50 then outputs the sensor information including the shooting information indicating the front of the mobile object 500 shot by the shooting apparatus to the information processing apparatus 10. In this case, the information processing apparatus 10 sets a timestamp for the sensor information from the sensor part 50, and acquires the sensor information as the scene information D1. The information processing apparatus 10 recognizes that the image information in the acquired scene information D1 includes the element information indicating turning left, automobile's traveling near the mobile object 500, daytime, and the like. Consequently, the information processing apparatus 10 sets the labels LA of "turning left" as traveling situation, "automobile's traveling near the mobile object 500" as traffic situation, and "fine, daytime" as environment situation for the scene information D1 as illustrated in FIG. 7. Then, in a case where the information processing server 100 gives an instruction to save a specific scene SN including the traveling situation and the traffic situation, the information processing apparatus 10 saves the scene information D1 illustrated in FIG. 7 in the storage part 17.

As described above, the information processing apparatus 10 according to the first embodiment sets the labels LA indicating the detailed element information included in the scene information D1 for the acquired scene information D1, and determines whether or not to save the information on the basis of the labels LA. Thereby, the information processing apparatus 10 can finely select the scene information D1 to be saved on the basis of the set labels LA, and can provide the scene information D1 set with the labels LA. Consequently, the information processing apparatus 10 sets the labels LA for the scene information D1, thereby restricting the data amount of the scene information D1 to be saved and contributing to accumulation of effectively usable data.

<Variant (2) of First Embodiment>

Figure 8:
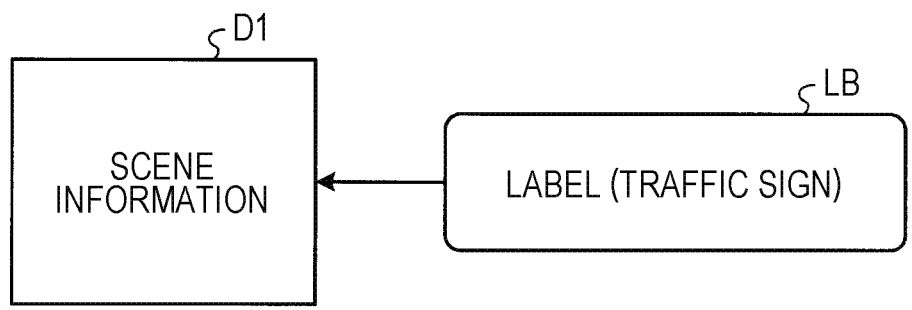
FIG. 8 is a diagram illustrating an exemplary label set for the scene information in the information processing apparatus according to a variant (2) of the first embodiment.

Exemplary operations of the information processing apparatus 10 according to a variant (2) of the first embodiment will be described below with reference to FIG. 8. FIG. 8 is a diagram illustrating an exemplary label set for the scene information D1 in the information processing apparatus 10 according to the variant (2) of the first embodiment.

For example, the sensor part 50 in the mobile object 500 outputs the sensor information including the shooting information indicating a traffic sign ahead of the mobile object 500 shot by the shooting apparatus to the information processing apparatus 10. In this case, the information processing apparatus 10 sets a timestamp for the sensor information from the sensor part 50, and acquires the sensor information as the scene information D1. The information processing apparatus 10 recognizes that the image information in the acquired scene information D1 includes the element information of the traffic sign. Consequently, the information processing apparatus 10 sets a label LB indicating "traffic sign" for the scene information D1 as illustrated in FIG. 8. Then, in a case where the information processing server 100 gives an instruction to save a specific scene including the traffic sign or the traffic situation, the information processing apparatus 10 saves the scene information D1 set with the label LB illustrated in FIG. 8 in the storage part 17.

As described above, when the acquired scene information D1 includes the element information indicating a traffic sign, the information processing apparatus 10 according to the present embodiment sets a label for classifying the traffic sign for the scene information D1. Thereby, the information processing apparatus 10 can set the label LB indicating the scene information D1 of the traffic sign for the scene information D1. Consequently, the information processing apparatus 10 can contribute to classification of the scene information D1 associated with the traffic sign by the label LB indicating the traffic sign.

<Variant (3) of First Embodiment>

Figure 9:
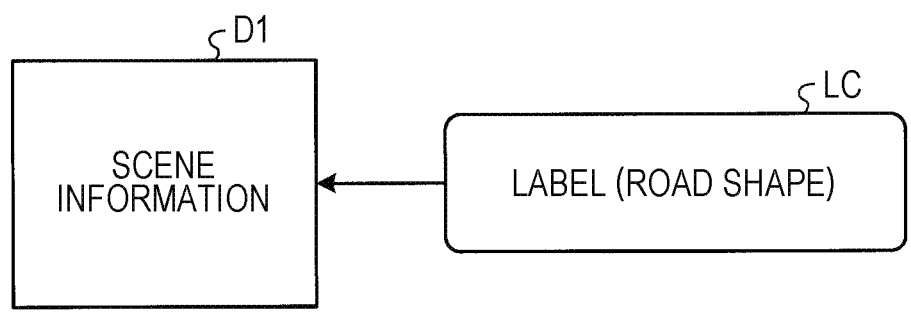
FIG. 9 is a diagram illustrating an exemplary label set for the scene information in the information processing apparatus according to a variant (3) of the first embodiment.

Exemplary operations of the information processing apparatus 10 according to a variant (3) of the first embodiment will be described below with reference to FIG. 9. FIG. 9 is a diagram illustrating an exemplary label set for the scene information D1 in the information processing apparatus 10 according to the variant (3) of the first embodiment.

For example, the sensor part 50 in the mobile object 500 outputs the sensor information including a road shape ahead of the mobile object 500 shot by the shooting apparatus to the information processing apparatus 10. In this case, the information processing apparatus 10 sets a timestamp for the sensor information from the sensor part 50, and acquires the sensor information as the scene information D1. The information processing apparatus 10 recognizes that the sensor information of the acquired scene information D1 includes the element information of the road shape. Consequently, the information processing apparatus 10 sets a label LC indicating "road shape" for the scene information D1 as illustrated in FIG. 9. Then, in a case where the information processing server 100 gives an instruction to save a specific scene including the road shape, the information processing apparatus 10 saves the scene information D1 set with the label LC illustrated in FIG. 9 in the storage part 17.

As described above, when the acquired scene information D1 includes the element information indicating the road shape, the information processing apparatus 10 according to the present embodiment sets the label LC for classifying the road shape for the scene information D1. Thereby, the information processing apparatus 10 can set the label LC indicating the scene information D1 of the road shape for the scene information D1. Consequently, the information processing apparatus 10 can contribute to classification of the scene information D1 associated with the road shape by the label LC indicating the road shape.

<Variant (4) of First Embodiment>

Figure 10:
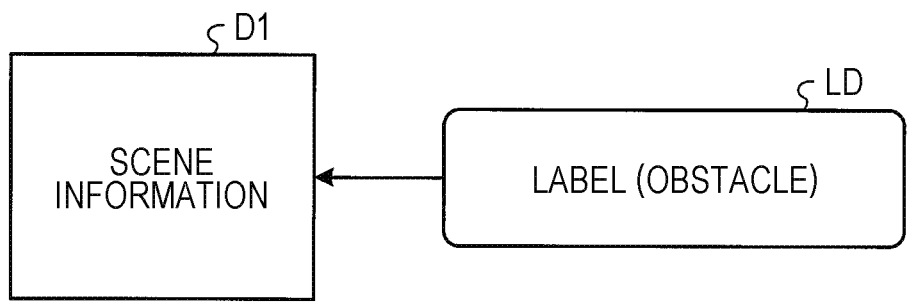
FIG. 10 is a diagram illustrating an exemplary label set for the scene information in the information processing apparatus according to a variant (4) of the first embodiment.

Exemplary operations of the information processing apparatus 10 according to a variant (4) of the first embodiment will be described below with reference to FIG. 10. FIG. 10 is a diagram illustrating an exemplary label set for the scene information D1 in the information processing apparatus 10 according to the variant (4) of the first embodiment.

For example, the sensor part 50 in the mobile object 500 outputs the sensor information including an obstacle ahead of the mobile object 500 shot by the shooting apparatus to the information processing apparatus 10. In this case, the information processing apparatus 10 sets a timestamp for the sensor information from the sensor part 50, and acquires the sensor information as the scene information D1. The information processing apparatus 10 recognizes that the sensor information of the acquired scene information D1 includes the element information of the obstacle. Consequently, the information processing apparatus 10 sets a label LD indicating "obstacle" for the scene information D1 as illustrated in FIG. 10. Then, in a case where the information processing server 100 gives an instruction to save a specific scene SN including the obstacle, the information processing apparatus 10 saves the scene information D1 set with the label LD illustrated in FIG. 10 in the storage part 17.

As described above, when the acquired scene information includes the element information indicating an obstacle on a traveling route, the information processing apparatus 10 according to the present embodiment sets the label LD for classifying the obstacle for the scene information D1. Thereby, the information processing apparatus 10 can set the label LD indicating the scene information D1 of the obstacle for the scene information D1. Consequently, the information processing apparatus 10 can contribute to classification of the scene information D1 associated with the obstacle by the label LD indicating the obstacle.

<Variant (5) of First Embodiment>

Figure 11:
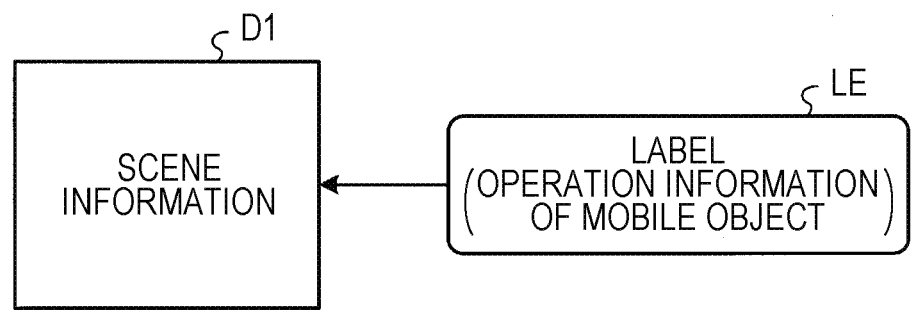
FIG. 11 is a diagram illustrating an exemplary label set for the scene information in the information processing apparatus according to a variant (5) of the first embodiment.

Exemplary operations of the information processing apparatus 10 according to a variant (5) of the first embodiment will be described below with reference to FIG. 11. FIG. 11 is a diagram illustrating an exemplary label set for the scene information D1 in the information processing apparatus 10 according to the variant (5) of the first embodiment.

For example, the sensor part 50 in the mobile object 500 outputs the sensor information including operation information of the mobile object 500 shot by the shooting apparatus to the information processing apparatus 10. In this case, the information processing apparatus 10 sets a timestamp for the sensor information from the sensor part 50, and acquires the sensor information as the scene information D1. The information processing apparatus 10 recognizes that the sensor information of the acquired scene information D1 includes the element information indicating the operation information. Consequently, the information processing apparatus 10 sets a label LE indicating "operation information of mobile object 500" for the scene information D1 as illustrated in FIG. 11. Then, in a case where the information processing server 100 gives an instruction to save a specific scene SN including the operation information of the mobile object 500, the information processing apparatus 10 saves the scene information D1 set with the label LE illustrated in FIG. 11 in the storage part 17.

As described above, when the acquired scene information D1 includes the element information indicating the operation information of the mobile object 500, the information processing apparatus 10 according to the present embodiment sets the label LE for classifying the operation information for the scene information D1. Thereby, the information processing apparatus 10 can set the label LE indicating the scene information D1 of the operation information of the mobile object 500 for the scene information D1. Consequently, the information processing apparatus 10 can contribute to classification of the scene information D1 associated with the traffic situation by the label LE indicating the operation information of the mobile object 500.

Additionally, the technical spirits of the variant (1) to the variant (5) of the first embodiment may be combined as necessary. In other words, the information processing apparatus 10 can combine the labels L, LA, LB, LC, LD, and LE and set the combined labels for the scene information D1.

<Exemplary Operations of System According to First Embodiment>

Figure 12:
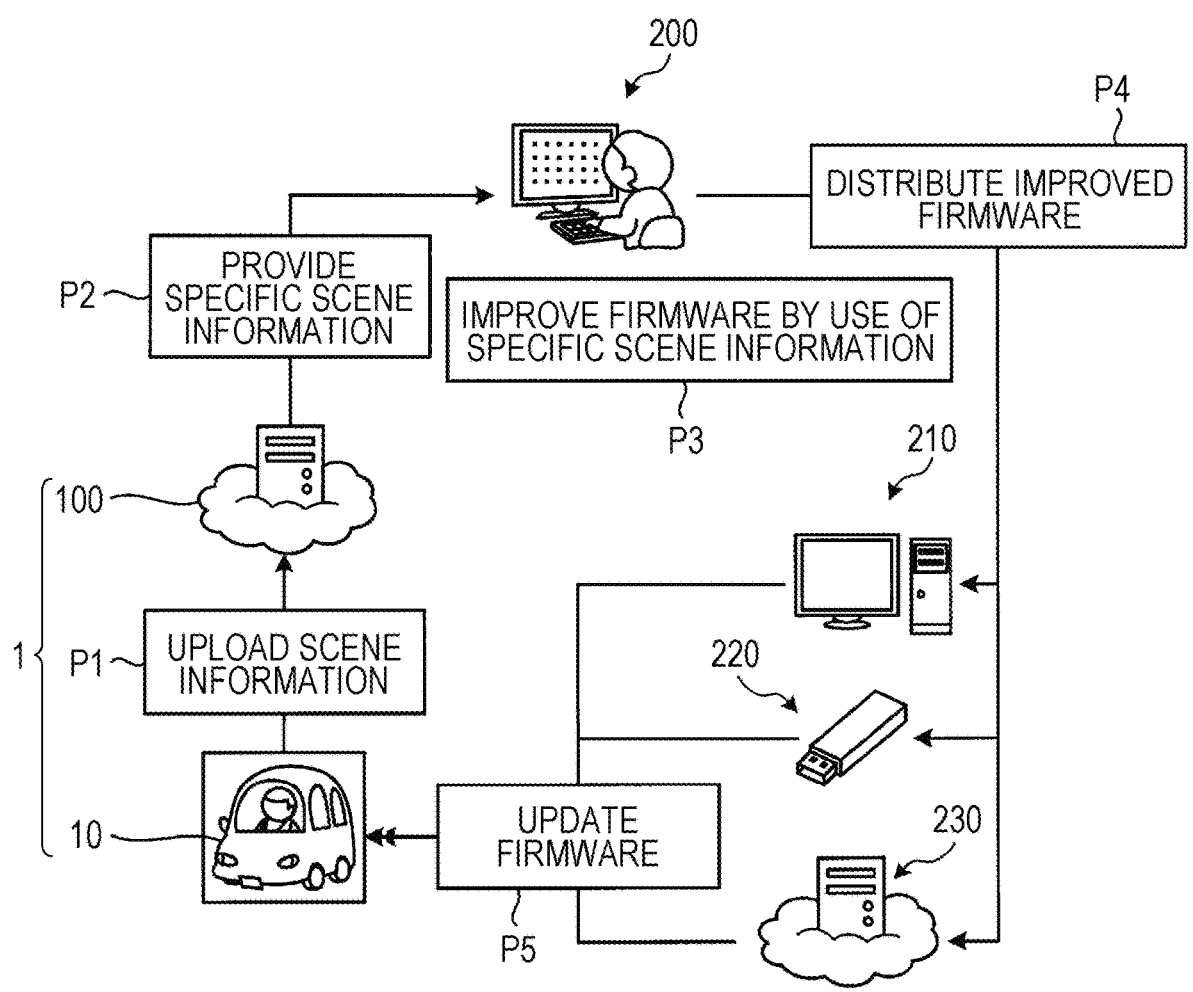
FIG. 12 is a diagram illustrating exemplary operations of the system including the information processing apparatus according to the first embodiment.

Exemplary operations of the system 1 according to the first embodiment will be described below with reference to FIG. 12. FIG. 12 is a diagram illustrating exemplary operations of the system 1 including the information processing apparatuses 10 according to the first embodiment.

The information processing apparatus 10 uploads the scene information D1 set with the labels L and the like on the information processing server 100 (Pass P1). Consequently, the information processing server 100 collects the scene information D1 uploaded from the mobile object 500, and classifies and registers it as the supervisor data 111.

Thereafter, when requested to collect the scene information D1 from an information processing terminal 200, the information processing server 100 collects the requested specific scene information D1 from the supervisor data 111 on the basis of the labels L and the like. The information processing server 100 then provides the specific scene information D1 to the information processing terminal 200 (Pass P2).

Consequently, the information processing terminal 200 improves the performance of the firmware (software) for autonomous movement mounted on the mobile object 500 by use of the collected scene information D1 (Pass P3). According to the present embodiment, the firmware is software of the information processing apparatus 10 such as the planning part 13 and the operation control part 14. The information processing terminal 200 then distributes the improved firmware (Pass P4). For example, the information processing terminal 200 distributes the improved firmware by use of a personal computer (PC) 210 for update, a USB memory 220, a distribution server 230, and the like.

The information processing apparatus 10 updates the firmware of the storage part 17 to the improved firmware (Pass P5).

As descried above, in the system 1 according to the present embodiment, the information processing server 100 can classify the scene information D1 collected from the information processing apparatus 10 in the mobile object 500 on the basis of the labels L and the like, register it as the supervisor data 111, and provide it to the developer of the mobile object 500. Thereby, the information processing server 100 in the system 1 can extract the scene information D1 desired for improving the autonomous movement performance of the mobile object 500 on the basis of the labels L and the like. Consequently, the system 1 can effectively use the scene information D1 for improving the performance of the mobile object 500 by the labels L and the like set by the information processing apparatus 10.

<Hardware Configuration>

Figure 13:
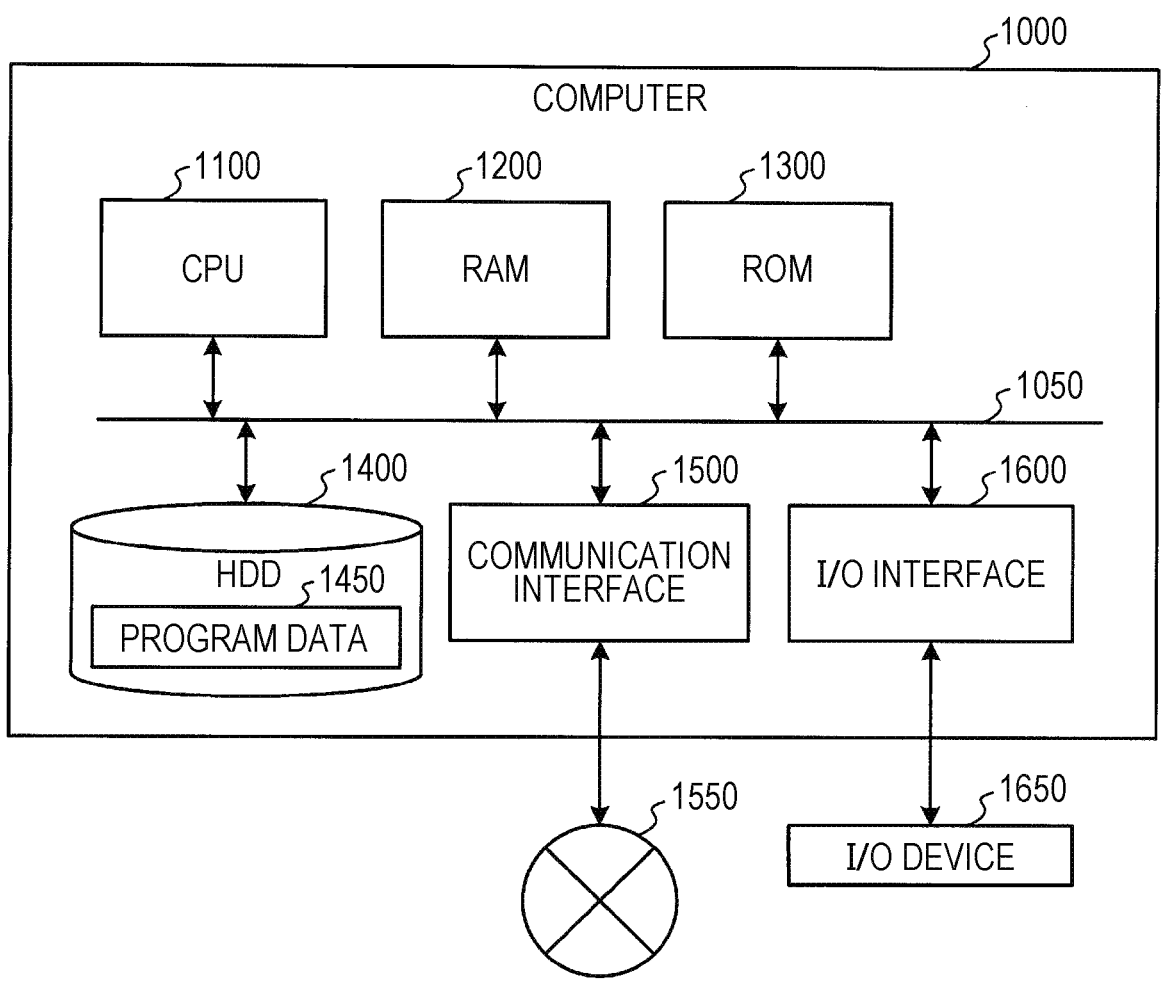
FIG. 13 is a hardware configuration diagram illustrating an exemplary computer realizing the functions of the information processing apparatus.

The information processing apparatus according to the above embodiment is realized by a computer 1000 in a configuration illustrated in FIG. 13, for example. The information processing apparatus 10 according to the first embodiment will be described below by way of example. FIG. 13 is a hardware configuration diagram illustrating an exemplary computer 1000 realizing the functions of the information processing apparatus 10. The computer 1000 has a CPU 1100, a RAM 1200, a read only memory (ROM) 1300, a hard disk drive (HDD) 1400, a communication interface 1500, and an I/O interface 1600. The respective parts in the computer 1000 are connected via a bus 1050.

The CPU 1100 operates on the basis of the programs stored in the ROM 1300 or the HDD 1400, and controls each part. For example, the CPU 1100 develops the programs stored in the ROM 1300 or the HDD 1400 into the RAM 1200, and performs the processings corresponding to various programs.

The ROM 1300 stores a boot program such as basic input output system (BIOS) executed by the CPU 1100 when the computer 1000 is activated, a program depending on the hardware of the computer 1000, or the like.

The HDD 1400 is a computer readable recording medium for temporarily recording programs executed by the CPU 1100, data used for the programs, and the like. Specifically, the HDD 1400 is a recording medium for recording the programs according to the embodiment of the present disclosure as exemplary program data 1450.

The communication interface 1500 is an interface for connecting the computer 1000 to an external network 1550 (such as Internet). For example, the CPU 1100 receives data from other device or transmits data generated by the CPU 1100 to other device via the communication interface 1500.

The I/O interface 1600 is an interface for connecting an I/O device 1650 and the computer 1000. For example, the CPU 1100 receives data from an input device such as keyboard or mouse via the I/O interface 1600. Further, the CPU 1100 transmits data to an output device such as display, speaker, or printer via the I/O interface 1600. Further, the I/O interface 1600 may function as a media interface for reading programs and the like recorded in a predetermined recording medium. The medium is an optical recording medium such as digital versatile disc (DVD), a magnetooptical recording medium such as magneto-optical disk (MO), a tape medium, a magnetic recording medium, a semiconductor memory, or the like.

For example, in a case where the computer 1000 functions as the information processing apparatus 10 according to the first embodiment, the CPU 1100 in the computer 1000 executes the programs loaded on the RAM 1200 thereby to realize the functions of the acquisition part 11, the recognition part 12, the planning part 13, the operation control part 14, the setting part 15, the determination part 16, the transmission part 18, the reception part 19, and the like. Further, the HDD 1400 stores the programs according to the embodiment of the present disclosure, or the data in the storage part 17. Additionally, the CPU 1100 reads and executes program data 1450 from the HDD 1400, but may acquire the programs from other device via the external network 1550 in other example.

Second Embodiment

<Exemplary Configuration of Vehicle Control System Applicable to Second Embodiment>

Figure 14:
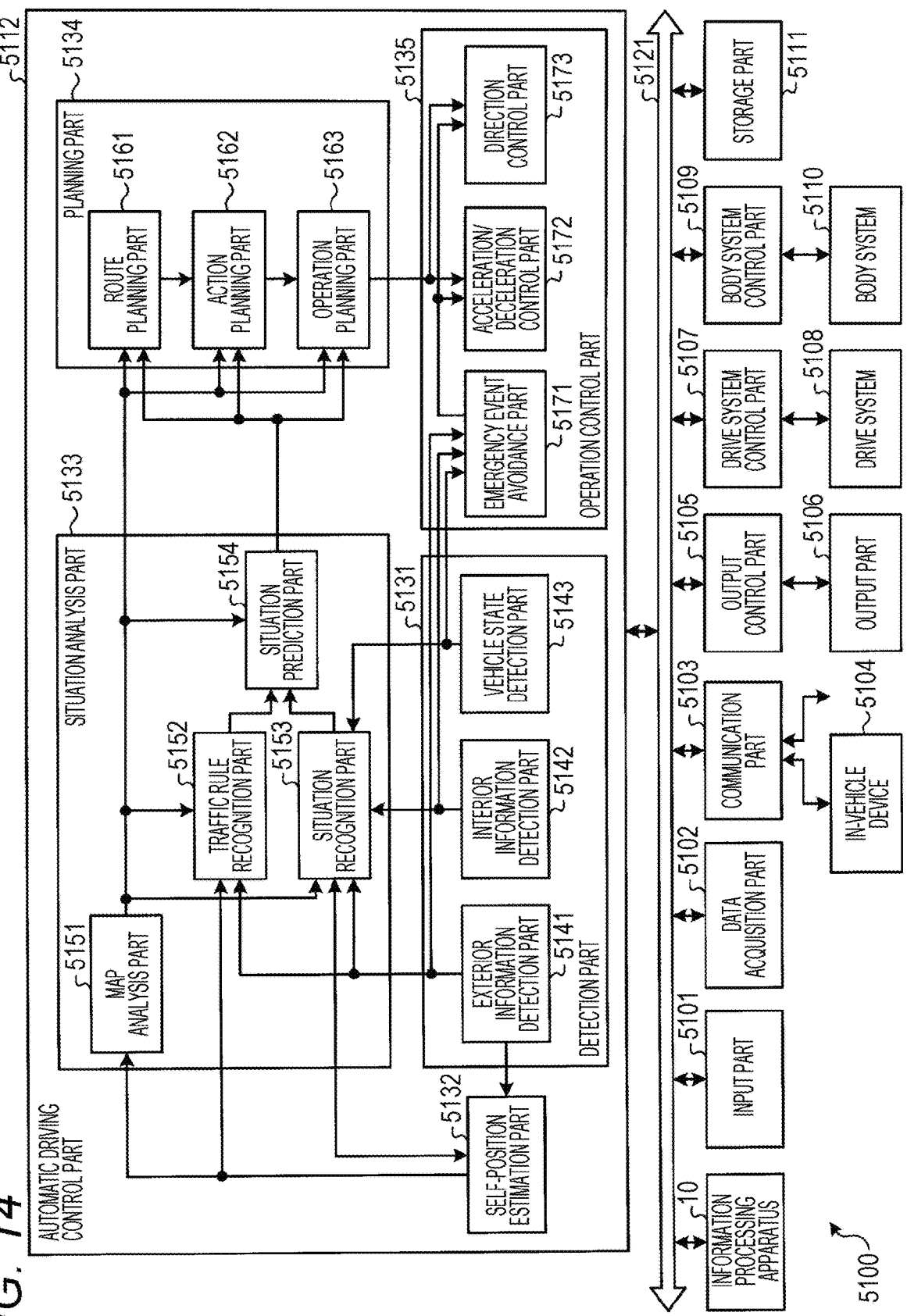
FIG. 14 is a block diagram illustrating an exemplary configuration of schematic functions of a vehicle control system according to a second embodiment to which the present technology is applied.

A second embodiment will be described below. FIG. 14 is a block diagram illustrating an exemplary configuration of schematic functions of a vehicle control system 5100 according to the second embodiment to which the present technology is applied. In FIG. 14, the vehicle control system 5100 is a control system for performing vehicle operation control mounted on a vehicle as an exemplary mobile object 500.

Additionally, in a case where a vehicle provided with the vehicle control system 5100 is discriminated from other vehicles, it will be denoted as self-car or self-vehicle below.

The vehicle control system 5100 includes an input part 5101, a data acquisition part 5102, a communication part 5103, an in-vehicle device 5104, an output control part 5105, an output part 5106, a drive system control part 5107, a drive system 5108, a body system control part 5109, a body system 5110, a storage part 5111, and an automatic driving control part 5112. The input part 5101, the data acquisition part 5102, the communication part 5103, the output control part 5105, the drive system control part 5107, the body system control part 5109, the storage part 5111, and the automatic driving control part 5112 are mutually connected via a communication network 5121.

The communication network 5121 is configured of a vehicle-mounted communication network, a bus, or the like conforming to any standard such as CAN, LIN, LAN, or FlexRay (registered trademark). Additionally, the respective parts in the vehicle control system 5100 may be directly connected not via the communication network 5121.

Additionally, in a case where the respective parts in the vehicle control system 5100 make communication via the communication network 5121, the description of the communication network 5121 is omitted below. For example, in a case where the input part 5101 and the automatic driving control part 5112 make communication via the communication network 5121, the description that the input part 5101 and the automatic driving control part 5112 make communication is simply made.

The input part 5101 includes an apparatus used by a passenger for inputting various items of data, instructions, or the like. For example, the input part 5101 includes an operation device such as touch panel, button, microphone, switch, and lever, and an operation device capable of inputting in a method other than manual operation such as voice or gesture. Further, the input part 5101 may be a remote control apparatus using an infrared ray or other radio wave, or an external connection apparatus such as mobile device or wearable device corresponding to the operations of the vehicle control system 5100, for example. The input part 5101 generates an input signal on the basis of data, an instruction, or the like input by the passenger, and supplies it to each part in the vehicle control system 5100.

The data acquisition part 5102 includes various sensors and the like for acquiring data used for the processings of the vehicle control system 5100, and supplies the acquired data to the respective parts in the vehicle control system 5100, the information processing apparatus 10, and the like.

For example, the data acquisition part 5102 includes various sensors for detecting a state and the like of the self-car. Specifically, the data acquisition part 5102 includes a gyro sensor, an acceleration sensor, an inertial measurement unit (IMU), and a sensor for detecting the operation amount of the acceleration pedal, the operation amount of the brake pedal, the steering angle of the steering wheel, engine revolutions, motor revolutions, the rotation speed of the wheels, or the like, for example.

Further, the data acquisition part 5102 includes various sensors for detecting the information indicating the exterior of the self-car, for example. Specifically, the data acquisition part 5102 includes a shooting apparatus such as ToF camera, stereo camera, monocular camera, infrared camera, and other camera, for example. Further, the data acquisition part 5102 includes an environment sensor for detecting the weather, a meteorological phenomenon, or the like, and a surrounding information detection sensor for detecting an object around the self-car, for example.

Further, the data acquisition part 5102 includes various sensors for detecting a current position of the self-car, for example. Specifically, the data acquisition part 5102 includes a GNSS receiver or the like for receiving a GNSS signal from a GNSS satellite, for example.

Further, the data acquisition part 5102 includes various sensors for detecting the information indicating the interior of the vehicle, for example. Specifically, the data acquisition part 5102 includes a shooting apparatus for shooting the driver, a biometric sensor for detecting biometric information of the driver, a microphone for collecting the sounds inside the vehicle, and the like, for example. The biometric sensor detects the biometric information of a passenger who is seated on a seat or the driver gripping the steering wheel, which is provided on the seat, the steering wheel, or the like, for example.

The communication part 5103 makes communication with the in-vehicle device 5104, and various devices, servers, base stations, and the like outside the vehicle, transmits the data supplied from each part in the vehicle control system 5100, and supplies the received data to each part in the vehicle control system 5100. Additionally, the communication protocol supported by the communication part 5103 is not particularly limited, and the communication part 5103 can support a plurality of kinds of communication protocols.

For example, the communication part 5103 makes wireless communication with the in-vehicle device 5104 via wireless LAN, Bluetooth (registered trademark), NFC, WUSB, or the like. Further, the communication part 5103 makes wired communication with the in-vehicle device 5104 via a connection terminal (not illustrated) (and a cable as necessary), USB, HDMI (registered trademark), MHL, or the like, for example.

Further, the communication part 5103 makes communication with a device (such as application server or control server) present on an external network (such as Internet, Cloud network, or provider-specific network) via a base station or access point, for example. Further, the communication part 5103 makes communication with a terminal present near the self-car (such as terminal of a pedestrian or a shop, or MTC terminal) by use of the P2P technology, for example. Further, the communication part 5103 makes V2X communication such as vehicle to vehicle communication, vehicle to infrastructure communication, vehicle to home communication, and vehicle to pedestrian communication, for example. Further, for example, the communication part 5103 includes a beacon reception part, receives a radio wave or electromagnetic wave originated from a wireless station or the like installed on a road, and acquires the information indicating current position, traffic jam, traffic regulation, duration, or the like.

The in-vehicle device 5104 includes a mobile device or wearable device of a passenger, an information device mounted or attached on the self-car, a navigation apparatus for searching a route to any destination, and the like, for example.

The output control part 5105 controls the output of various items of information to a passenger in the self-car or the outside of the self-car. For example, the output control part 5105 generates an output signal including at least one of visual information (such as image data) or auditory information (such as voice data), and supplies it to the output part 5106, thereby controlling the output of the visual information and the auditory information from the output part 5106. Specifically, the output control part 5105 combines the image data shot by different shooting apparatuses in the data acquisition part 5102 thereby to generate a perspective image, a panorama image, or the like, and supplies an output signal including the generated image to the output part 5106, for example. Further, the output control part 5105 generates voice data including an alarm sound, an alarm message, or the like for a danger such as collision, accidental contact, or entry into danger zone, and supplies an output signal including the generated voice data to the output part 5106, for example.

The output part 5106 includes an apparatus capable of outputting the visual information or the auditory information to a passenger in the self-car or the outside of the self-car. For example, the output part 5106 includes a display apparatus, an instrument panel, an audio speaker, headphones, a wearable device such as glasses-type display worn by a passenger, a projector, a lamp, and the like. The display apparatus provided in the output part 5106 may be an apparatus for displaying the visual information within the field of view of the driver such as a head-up display, a transmissive display, or an apparatus having the augmented reality (AR) display function other than the apparatuses having a typical display.

The drive system control part 5107 generates and supplies various control signals to the drive system 5108 thereby to control the drive system 5108. Further, the drive system control part 5107 supplies the control signals to the respective parts other than the drive system 5108 as necessary thereby to provide notification of the control state of the drive system 5108.

The drive system 5108 includes various apparatuses for the drive system of the self-car. For example, the drive system 5108 includes a driving force generation apparatus for generating a driving force of the internal engine, the drive motor, or the like, a driving force transmission mechanism for transmitting a driving force to the wheels, a steering mechanism for adjusting the steering angle, a braking apparatus for generating a braking force, ABS, ESC, an electric power steering apparatus, and the like.

The body system control part 5109 generates and supplies various control signals to the body system 5110 thereby to control the body system 5110. Further, the body system control part 5109 supplies the control signals to the respective parts other than the body system 5110 as necessary, and provides notification of the control state and the like of the body system 5110.

The body system 5110 includes various apparatuses for the body system equipped on the vehicle body. For example, the body system 5110 includes a keyless entry system, a smart key system, a power window apparatus, a power seat, a steering wheel, an air-conditioning apparatus, various lamps (such as head lights, backlights, brake light, indication lights, and fog light), and the like.

The storage part 5111 includes a magnetic storage device such as ROM, RAM, or HDD, a semiconductor device, an optical storage device, a magnetooptical storage device, and the like. The storage part 5111 stores various programs, data, or the like used in the respective parts in the vehicle control system 5100. For example, the storage part 5111 stores the map data including a 3D high-definition map such as dynamic map, a global map with lower definition and wider coverage area than high-definition map, and a local map including the information around the self-car.

The automatic driving control part 5112 performs control for automatic driving such as autonomous traveling or driving assistance. Specifically, the automatic driving control part 5112 performs cooperative control for realizing the advanced driver assistance system (ADAS) function including collision avoidance or collision alleviation of the self-car, follow-up traveling based on inter-vehicle distance, traveling at kept vehicle speed, collision alarm of the self-car, or lane deviation alarm of the self-car, for example. Further, the automatic driving control part 5112 performs cooperative control for automatic driving and the like of autonomous traveling irrespective of driver's operation, for example. The automatic driving control part 5112 includes a detection part 5131, a self-position estimation part 5132, a situation analysis part 5133, a planning part 5134, and an operation control part 5135.

The detection part 5131 detects various items of information desired for automatic driving control. The detection part 5131 includes an exterior information detection part 5141, an interior information detection part 5142, and a vehicle state detection part 5143.

The exterior information detection part 5141 detects the information indicating the exterior of the self-car on the basis of the data or signal from each part in the vehicle control system 5100. For example, the exterior information detection part 5141 performs a processing of detecting an object around the self-car, a recognition processing, a tracking processing, and a processing of detecting a distance to an object. The objects to be detected include vehicle, person, obstacle, structure, road, traffic light, traffic sign, traffic indication, and the like, for example. Further, the exterior information detection part 5141 detects an environment around the self-car, for example. The surrounding environments to be detected include weather, temperature, humidity, brightness, road state, and the like, for example. The exterior information detection part 5141 supplies the data indicating the detection processing result to the self-position estimation part 5132, a map analysis part 5151, a traffic rule recognition part 5152, and a situation recognition part 5153 in the situation analysis part 5133, an emergency event avoidance part 5171 in the operation control part 5135, and the like.

The interior information detection part 5142 detects the information indicating the interior of the self-car on the basis of the signal or data from each part in the vehicle control system 5100. For example, the interior information detection part 5142 performs the processings of authenticating and recognizing the driver, a processing of detecting a driver's state, a processing of detecting a passenger, a processing of detecting an environment inside the self-car, and the like. The driver's states to be detected include physical condition, degree of awareness, degree of concentration, degree of fatigue, line of sight direction, and the like, for example. The environments inside the self-car to be detected include temperature, humidity, brightness, odor, and the like, for example. The interior information detection part 5142 supplies the data indicating the detection processing result to the situation recognition part 5153 in the situation analysis part 5133, the emergency event avoidance part 5171 in the operation control part 5135, and the like.

The vehicle state detection part 5143 detects a state of the self-car on the basis of the data or signal from each part in the vehicle control system 5100. The states of the self-car to be detected include speed, acceleration, steering angle, presence and contents of abnormality, driving operation state, position and tilt of the power seat, door lock state, states of other vehicle-mounted devices, and the like, for example. The vehicle state detection part 5143 supplies the data indicating the detection processing result to the situation recognition part 5153 in the situation analysis part 5133, the emergency event avoidance part 5171 in the operation control part 5135, and the like.

The self-position estimation part 5132 estimates a position, a posture, and the like of the self-car on the basis of the data or signal from each part in the vehicle control system 5100 such as the exterior information detection part 5141 and the situation recognition part 5153 in the situation analysis part 5133. Further, the self-position estimation part 5132 generates a local map (denoted as self-position estimation map below) used for estimating a self-position as necessary. The self-position estimation map is a high-definition map using a technology such as simultaneous localization and mapping (SLAM). The self-position estimation part 5132 supplies the data indicating the estimation processing result to the map analysis part 5151, the traffic rule recognition part 5152, the situation recognition part 5153, and the like in the situation analysis part 5133. Further, the self-position estimation part 5132 stores the self-position estimation map in the storage part 5111.

The situation analysis part 5133 analyzes the situations of the self-car and its surroundings. The situation analysis part 5133 includes the map analysis part 5151, the traffic rule recognition part 5152, the situation recognition part 5153, and a situation prediction part 5154.

The map analysis part 5151 analyzes various maps stored in the storage part 5111 by use of the data or signal from each part in the vehicle control system 5100 such as the self-position estimation part 5132 and the exterior information detection part 5141 as necessary, and constructs a map including the information desired for the automatic driving processing. The map analysis part 5151 supplies the constructed map to the traffic rule recognition part 5152, the situation recognition part 5153, the situation prediction part 5154, a route planning part 5161, an action planning part 5162, and an operation planning part 5163 in the planning part 5134, and the like.

The traffic rule recognition part 5152 recognizes a traffic rule around the self-car on the basis of the data or signal from each part in the vehicle control system 5100 such as the self-position estimation part 5132, the exterior information detection part 5141, and the map analysis part 5151. The position and state of a traffic light around the self-car, the contents of a traffic regulation around the self-car, a travelable lane, and the like are recognized, for example, in the recognition processing. The traffic rule recognition part 5152 supplies the data indicating the recognition processing result to the situation prediction part 5154 and the like.

The situation recognition part 5153 recognizes a situation of the self-car on the basis of the data or signal from each part in the vehicle control system 5100 such as the self-position estimation part 5132, the exterior information detection part 5141, the interior information detection part 5142, the vehicle state detection part 5143, and the map analysis part 5151. For example, the situation recognition part 5153 recognizes a situation of the self-car, a situation around the self-car, a situation of the driver of the self-car, and the like. Further, the situation recognition part 5153 generates a local map (denoted as situation recognition map below) used for recognizing a situation around the self-car as necessary. The situation recognition map is an occupancy grid map, for example.

The situations of the self-car to be recognized include position, posture, and motion (such as speed, acceleration, and moving direction) of the self-car, presence and contents of abnormality, and the like, for example. The situations around the self-car to be recognized include kind and position of surrounding still object, kind, position, and motion (such as speed, acceleration, and moving direction) of surrounding moving object, configuration of surrounding road, state of road, surrounding weather, temperature, humidity, brightness, and the like, for example. The driver's states to be recognized include physical condition, degree of awareness, degree of concentration, degree of fatigue, motion of line of sight, driving operation, and the like, for example.

The situation recognition part 5153 supplies the data indicating the recognition processing result (including the situation recognition map as necessary) to the self-position estimation part 5132, the situation prediction part 5154, and the like. Further, the situation recognition part 5153 stores the situation recognition map in the storage part 5111.

The situation prediction part 5154 predicts a situation of the self-car on the basis of the data or signal from each part in the vehicle control system 5100 such as the map analysis part 5151, the traffic rule recognition part 5152, and the situation recognition part 5153. For example, the situation prediction part 5154 predicts a situation of the self-car, a situation around the self-car, a situation of the driver, and the like, for example.

The situations of the self-car to be predicted include behavior of the self-car, occurrence of abnormality, travelable distance, and the like, for example. The situations around the self-car to be predicted include behavior of moving object around the self-car, change in state of traffic light, change in environment such as weather, and the like, for example. The situations of the driver to be predicted include behavior, physical condition, and the like of the driver, for example.

The situation prediction part 5154 supplies the data indicating the prediction processing result and the data from the traffic rule recognition part 5152 and the situation recognition part 5153 to the route planning part 5161, the action planning part 5162, the operation planning part 5163, and the like in the planning part 5134.

The route planning part 5161 plans a route to a destination on the basis of the data or signal from each part in the vehicle control system 5100 such as the map analysis part 5151 and the situation prediction part 5154. For example, the route planning part 5161 sets a route from the current position to the designated destination on the basis of the global map. Further, the route planning part 5161 changes the route as necessary on the basis of a situation such as traffic jam, traffic accident, traffic regulation, or construction, a physical condition of the driver, and the like, for example. The route planning part 5161 supplies the data indicating the planned route to the action planning part 5162 and the like.

The action planning part 5162 plans an action of the self-car for safely traveling on the route planned by the route planning part 5161 within the planned time on the basis of the data or signal from each part in the vehicle control system 5100 such as the map analysis part 5151 and the situation prediction part 5154. For example, the action planning part 5162 plans starting, stopping, traveling direction (such as traveling forward, traveling backward, turning left, turning right, and direction changing), traveling lane, traveling speed, overtaking, and the like. The action planning part 5162 supplies the data indicating the planned action of the self-car to the operation planning part 5163 and the like.

The operation planning part 5163 plans an operation of the self-car for realizing the action planned by the action planning part 5162 on the basis of the data or signal from each part in the vehicle control system 5100 such as the map analysis part 5151 and the situation prediction part 5154. For example, the operation planning part 5163 plans acceleration, deceleration, traveling trajectory, and the like. The operation planning part 5163 supplies the data indicating the planned operation of the self-car to an acceleration/deceleration control part 5172, a direction control part 5173, and the like in the operation control part 5135.

The operation control part 5135 controls the operations of the self-car. The operation control part 5135 includes the emergency event avoidance part 5171, the acceleration/deceleration control part 5172, and the direction control part 5173.

The emergency event avoidance part 5171 detects an emergency event such as collision, accidental contact, entry into danger zone, abnormality of the driver, and abnormality of the vehicle on the basis of the detection results of the exterior information detection part 5141, the interior information detection part 5142, and the vehicle state detection part 5143. The emergency event avoidance part 5171 plans an operation of the self-car for avoiding an emergency event such as sudden stop or sudden turning when detecting an occurrence of the emergency event. The emergency event avoidance part 5171 supplies the data indicating the planned operation of the self-car to the acceleration/deceleration control part 5172, the direction control part 5173, and the like.

The acceleration/deceleration control part 5172 controls acceleration/deceleration for realizing the operation of the self-car planned by the operation planning part 5163 or the emergency event avoidance part 5171. For example, the acceleration/deceleration control part 5172 calculates a control target value of the driving force generation apparatus or the braking apparatus for realizing the planned acceleration, deceleration, or sudden stop, and supplies a control instruction indicating the calculated control target value to the drive system control part 5107.

The direction control part 5173 performs direction control for realizing the operation of the self-car planned by the operation planning part 5163 or the emergency event avoidance part 5171. For example, the direction control part 5173 calculates a control target value of the steering mechanism for realizing the traveling trajectory or sudden turning planned by the operation planning part 5163 or the emergency event avoidance part 5171, and supplies a control instruction indicating the calculated control target value to the drive system control part 5107.

Additionally, in a case where the vehicle does not perform the automatic driving control such as autonomous traveling or driving assistance, the automatic driving control part 5112 in FIG. 14 can be omitted.

The communication network 5121 is connected with the information processing apparatus 10 described according to the first embodiment. The information processing apparatus 10 includes the acquisition part 11, the setting part 15, the determination part 16, the transmission part 18, and the reception part 19, for example (see FIG. 3). The information processing apparatus 10 is connected to the communication network 5121, and can acquire the information from the respective parts connected to the communication network 5121. The information processing apparatus 10 may be connected to the communication part 5103, not limited to the above.

The acquisition part 11 in the information processing apparatus 10 can acquire the scene information D1 via the data acquisition part 5102. The information processing apparatus 10 can acquire various results of the situation recognition part 5153, the situation prediction part 5154, and the like in the situation analysis part 5133 as the element information, for example. The information processing apparatus 10 can use the planning part 5134 as the planning part 13. The information processing apparatus 10 can use the storage part 5111 as the storage part 17. The storage part 5111 can store the scene information D1, for example. The information processing apparatus 10 may read and execute the program data from the storage part 5111. The transmission part 18 and the reception part 19 in the information processing apparatus 10 can exchange via the communication part 5103. The information processing apparatus 10 can transmit the scene information D1 set with the labels L and the like to the information processing server 100 via the communication part 5103.

As described above, the information processing apparatus 10 according to the second embodiment sets one or more labels L and the like corresponding to the element information included in the scene information D1 for the scene information D1 acquired in the vehicle control system 5100, and determines whether or not to save the information on the basis of the labels L and the like. Thereby, the information processing apparatus 10 can select the scene information D1 to be saved on the basis of the set labels L and the like, and can provide the scene information D1 set with the labels L and the like. Consequently, the information processing apparatus 10 sets the labels L and the like for the scene information D1, thereby restricting the data amount of the scene information D1 to be saved and contributing to accumulation of effectively usable data. That is, the information processing apparatus 10 according to the second embodiment can obtain the similar operational effects as in the first embodiment.

Additionally, the second embodiment has been described assuming that the information processing apparatus 10 in the vehicle control system 5100 is connected to the communication network 5121, but is not limited thereto. For example, the information processing apparatus 10 according to the second embodiment may be incorporated in the vehicle control system 5100. For example, the information processing apparatus 10 may realize the components such as the setting part 15 and the determination part 16 by the situation analysis part 5133, the output control part 5105, and the like in the vehicle control system 5100.

The preferred embodiments of the present disclosure have been described above in detail with reference to the accompanying drawings, but the technical scope of the present disclosure is not limited to the examples. It is clear to those skilled in the art in the technical field of the present disclosure that various changes or modifications can be assumed within the scope of the technical spirit described in CLAIMS, and these of course fall within the technical scope of the present disclosure.

Further, the effects described in the present specification are merely explanatory or exemplary, and are not restrictive. That is, the technology according to the present disclosure can obtain other effects clear to those skilled in the art from the description of the present specification together with the above effects or instead of the above effects.

Further, a program for causing the hardware such as CPU, ROM, and RAM incorporated in a computer to achieve the equivalent functions to the components of the information processing apparatus 10 can be created, and a computer readable recording medium recording the program therein can be provided.

Further, each step in the processings of the information processing apparatus in the present specification does not necessarily need to be processed in time series in the order described in the flowcharts. For example, each step in the processings of the information processing apparatus may be processed in a different order from the orders described in the flowcharts, or may be processed in parallel.

Additionally, the following configurations also belong to the technical scope of the present disclosure.

(1)

An information processing apparatus including:
a processor in communication with a memory configured to store instructions that, when executed by the processor, cause the processor to:
set a label based on element information included in scene information for a scene; and
determine, based on the set label, whether or not to store the scene information set with the label.

(2)

The information processing apparatus according to (1), wherein the instructions further cause the processor to:
recognize the element information included in the scene information.

(3)

The information processing apparatus according to (1) or (2), wherein the instructions further cause the processor to:
determine whether the element information is indicative of a traffic situation, and
setting the label comprises setting the label to classify the traffic situation for the scene information when it is determined that the element information is indicative of a traffic situation.

(4)

The information processing apparatus according to any of (1) to (3), wherein the instructions further cause the processor to:
determine whether the element information is indicative of an environment situation, and
setting the label comprises setting the label to classify the environment situation for the scene information when it is determined that the element information is indicative of an environment situation.

(5)

The information processing apparatus according to any of (1) to (4), wherein the instructions further cause the processor to:
determine whether the element information is indicative of a traffic sign, and setting the label comprises setting the label to classify the traffic sign for the scene information when it is determined that the element information is indicative of a traffic sign.

(6)

The information processing apparatus according to any of (1) to (5), wherein the instructions further cause the processor to:
determine whether the element information is indicative of a road shape, and
setting the label comprises setting the label to classify the road shape for the scene information when it is determined that the element information is indicative of a road shape.

(7)

The information processing apparatus according to any of (1) to (6), wherein the instructions further cause the processor to:
determine whether the element information is indicative of an obstacle on a traveling route, and
setting the label comprises setting the label to classify the obstacle for the scene information when it is determined that the element information is indicative of an obstacle on a traveling route.

(8)

The information processing apparatus according to any of (1) to (7), wherein the instructions further cause the processor to:
determine whether the element information is indicative of operation information of a mobile object, and
setting the label comprises setting the label to classify the operation information for the scene information when it is determined that the element information is indicative of operation information of a mobile object.

(9)

The information processing apparatus according to any of (1) to (8), wherein the instructions further cause the processor to:
set time information at which the scene information is acquired for the scene information.

(10)

The information processing apparatus according to any of (1) to (9), wherein the instructions further cause the processor to:
store the scene information in a storage device; and
transmit the scene information to an external server.

(11)

The information processing apparatus according to (10), wherein the instructions further cause the processor to transmit the stored scene information to the external server in response to an instruction from the external server.

(12)

The information processing apparatus according to (10) or (11), wherein the instructions further cause the processor to transmit, to the external server, the scene information based on the set label.

(13)

The information processing apparatus according to any of (10) to (12), wherein the instructions further cause the processor to transmit the scene information stored in the storage device to the external server at a certain cycle.

(14)

The information processing apparatus according to any of (10) to (13),
wherein in a case where an emergency operation is confirmed in at least one of a steering operation or a brake operation of a mobile object, the instructions further cause the processor to transmit the scene information stored in the storage device to the external server.

(15)

The information processing apparatus according to any of (1) to (14),
wherein in a case where the label corresponding to the element information included in the scene information is not present, the instructions further cause the processor to set the label indicating that the scene indicated by the scene information is unknown for the scene information.

(16)

The information processing apparatus according to any of (1) to (15), wherein the instructions further cause the processor to acquire the scene information including sensor information of at least one of a plurality of kinds of sensors.

(17)

An information processing method executed by a computer comprising a processor in communication with a memory configured to store instructions that, when executed by the processor, cause the processor to perform:
setting a label based on element information included in scene information for a scene; and
determining, based on the set label, whether or not to store the scene information set with the label.

(18)

The information processing method according to (17), wherein the instructions further cause the processor to perform:
recognizing the element information included in the scene information.

(19)

The information processing method according to (17), wherein the instructions further cause the processor to perform:
storing the scene information in a storage device; and
transmitting the scene information to an external server.

(20)

A non-transitory computer readable medium comprising a program that, when executed by a processor, cause the processor to:
set a label corresponding to element information included in scene information for a scene; and
determine, based on the set label, whether or not to store the scene information set with the label.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 System
10 Information processing apparatus
11 Acquisition part
12 Recognition part
13 Planning part
14 Operation control part
15 Setting part
16 Determination part
17 Storage part
18 Transmission part
19 Reception part
50 Sensor part
60 Communication part 70 Drive part
100 Information processing server
110 Storage part
120 Communication part
130 Control part
500 Mobile object
D1 Scene information
D2 Designation information
L, LA, LB, LC, LD, LE Label

The invention claimed is:

1. An information processing apparatus comprising:
a processor in communication with a memory configured to store instructions that, when executed by the processor, cause the processor to:
receive designation information from an external server, the designation information designating specific scene information to be selected from scene information acquired by a sensor, to be stored and to be transmitted to the external server;
set a label selected from a plurality of labels based on element information included in the acquired scene information;
determine, based on the set label and the received designation information, whether or not to store the scene information associated with the label;
transmit stored scene information to the external server;
receive from the external server control software which is based, at least in part, on the transmitted scene information; and
control performance of a mobile object using the received control software.

2. The information processing apparatus according to claim 1, wherein the instructions further cause the processor to:
recognize the element information included in the scene information.

3. The information processing apparatus according to claim 1, wherein the instructions further cause the processor to:
determine whether the element information is indicative of a traffic situation, and
wherein setting the label comprises setting the label to classify the traffic situation for the scene information when it is determined that the element information is indicative of a traffic situation.

4. The information processing apparatus according to claim 1, wherein the instructions further cause the processor to:
determine whether the element information is indicative of an environment situation, and
wherein setting the label comprises setting the label to classify the environment situation for the scene information when it is determined that the element information is indicative of an environment situation.

5. The information processing apparatus according to claim 1, wherein the instructions further cause the processor to:
determine whether the element information is indicative of a traffic sign, and
wherein setting the label comprises setting the label to classify the traffic sign for the scene information when it is determined that the element information is indicative of a traffic sign.

6. The information processing apparatus according to claim 1, wherein the instructions further cause the processor to:
determine whether the element information is indicative of a road shape, and
wherein setting the label comprises setting the label to classify the road shape for the scene information when it is determined that the element information is indicative of a road shape.

7. The information processing apparatus according to claim 1, wherein the instructions further cause the processor to:
determine whether the element information is indicative of an obstacle on a traveling route, and
wherein setting the label comprises setting the label to classify the obstacle for the scene information when it is determined that the element information is indicative of an obstacle on a traveling route.

8. The information processing apparatus according to claim 1, wherein the instructions further cause the processor to:
determine whether the element information is indicative of operation information of a mobile object, and
wherein setting the label comprises setting the label to classify the operation information for the scene information when it is determined that the element information is indicative of operation information of a mobile object.

9. The information processing apparatus according to claim 1, wherein the instructions further cause the processor to:
set time information at which the scene information is acquired for the scene information.

10. The information processing apparatus according to claim 1, wherein the instructions further cause the processor to:
store the scene information in a storage device; and
transmit the scene information to an external server.

11. The information processing apparatus according to claim 10, wherein the instructions further cause the processor to transmit the stored scene information to the external server in response to an instruction from the external server.

12. The information processing apparatus according to claim 10, wherein the instructions further cause the processor to transmit, to the external server, the scene information based on the set label.

13. The information processing apparatus according to claim 10, wherein the instructions further cause the processor to transmit the scene information stored in the storage device to the external server at a certain cycle.

14. The information processing apparatus according to claim 10, wherein in a case where an emergency operation is confirmed in at least one of a steering operation or a brake operation of a mobile object, the instructions further cause the processor to transmit the scene information stored in the storage device to the external server.

15. The information processing apparatus according to claim 1, wherein in a case where the label corresponding to the element information included in the scene information is not present, the instructions further cause the processor to set the label indicating that the scene indicated by the scene information is unknown for the scene information.

16. The information processing apparatus according to claim 1, wherein the instructions further cause the processor to acquire the scene information including sensor information of at least one of a plurality of kinds of sensors.

17. An information processing method executed by a computer comprising a processor in communication with a memory configured to store instructions that, when executed by the processor, cause the processor to perform:

receiving designation information from an external server, the designation information designating specific scene information to be selected from scene information acquired by a sensor, to be stored and to be transmitted to the external server;

setting a label selected from a plurality of labels based on element information included in the acquired scene information;

determining, based on the set label and the received designation information, whether or not to store the scene information associated with the label;

transmitting stored scene information to the external server;

receiving from the external server control software which is based, at least in part, on the transmitted scene information; and controlling performance of a mobile object using the received control software.

18. The information processing method according to claim 17, wherein the instructions further cause the processor to perform: recognizing the element information included in the scene information.

19. The information processing method according to claim 17, wherein the instructions further cause the processor to perform: storing the scene information in a storage device; and transmitting the scene information to an external server.

20. A non-transitory computer readable medium comprising a program that, when executed by a processor, causes the processor to:

receive designation information from an external server, the designation information designating specific scene information to be selected from scene information acquired by a sensor, to be stored and to be transmitted to the external server;

set a label selected from a plurality of labels corresponding to element information included in the acquired scene information;

determine, based on the set label and the received designation information, whether or not to store the scene information associated with the label;

transmit stored scene information to the external server;

receive from the external server control software which is based, at least in part, on the transmitted scene information; and control performance of a mobile object using the received control software.

\* \* \* \* \*